US008706741B2

(12) United States Patent
Murakoshi

(10) Patent No.: US 8,706,741 B2
(45) Date of Patent: Apr. 22, 2014

(54) INFORMATION PROCESSING APPARATUS AND PLAY LIST DISPLAY METHOD

(75) Inventor: Sho Murakoshi, Tokyo (JP)

(73) Assignee: Sony Corporation (JP)

( * ) Notice: Subject to any disclaimer, the term of this patent is extended or adjusted under 35 U.S.C. 154(b) by 494 days.

(21) Appl. No.: 12/802,520

(22) Filed: Jun. 8, 2010

(65) Prior Publication Data

US 2011/0010395 A1 Jan. 13, 2011

(30) Foreign Application Priority Data

Jul. 10, 2009 (JP) ................. P2009-163774

(51) Int. Cl.
*G06F 17/30* (2006.01)
(52) U.S. Cl.
USPC ........................................... 707/749
(58) Field of Classification Search
USPC ........................................... 707/749
See application file for complete search history.

(56) References Cited

U.S. PATENT DOCUMENTS

| 8,121,462 | B2 * | 2/2012 | Nakai et al. | 386/278 |
| 2008/0060001 | A1 * | 3/2008 | Logan et al. | 725/34 |
| 2010/0077435 | A1 * | 3/2010 | Kandekar et al. | 725/61 |

FOREIGN PATENT DOCUMENTS

JP 2007-287256 A 11/2007

OTHER PUBLICATIONS

Assfalg, Jurgen, et al. "Semantic annotation of sports videos." Multimedia, IEEE 9.2 (2002): 52-60.*
Kokaram, Anil, et al. "Browsing sports video: trends in sports-related indexing and retrieval work." Signal Processing Magazine, IEEE 23.2 (2006): 47-58.*
Jain, Ramesh, and Koji Wakimoto. "Multiple perspective interactive video." Multimedia Computing and Systems, 1995., Proceedings of the International Conference on. IEEE, 1995.*

* cited by examiner

*Primary Examiner* — Usmaan Saeed
*Assistant Examiner* — Nan Hutton
(74) *Attorney, Agent, or Firm* — Lerner, David, Littenberg, Krumholz & Mentlik, LLP

(57) ABSTRACT

Apparatus and method for information processing may control reproducing from a play list. When reproducing is switched from a first play list to a second play list, the play list reproduction unit controls reproducing from the second play list to start from a reproduction segment of the second play list having a start time closest to a time point at which the reproducing from the first play list is stopped when the reproducing is switched from the first play list to the second play list.

31 Claims, 19 Drawing Sheets

FIG. 1A GOAL SCENE PLAY LIST 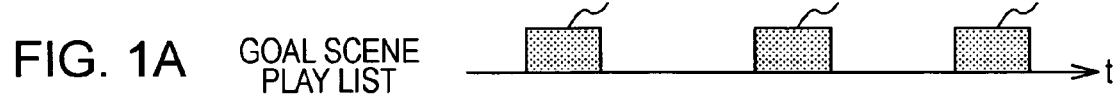
FIG. 1B CHEERING SCENE PLAY LIST 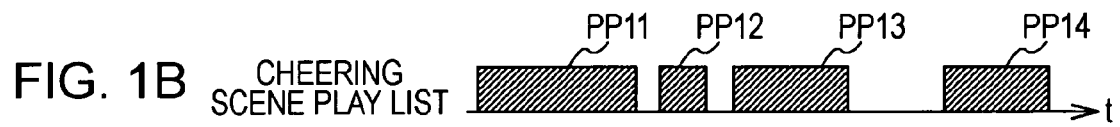
FIG. 1C COMBINED CASE 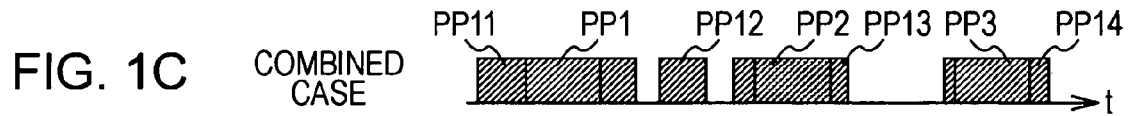

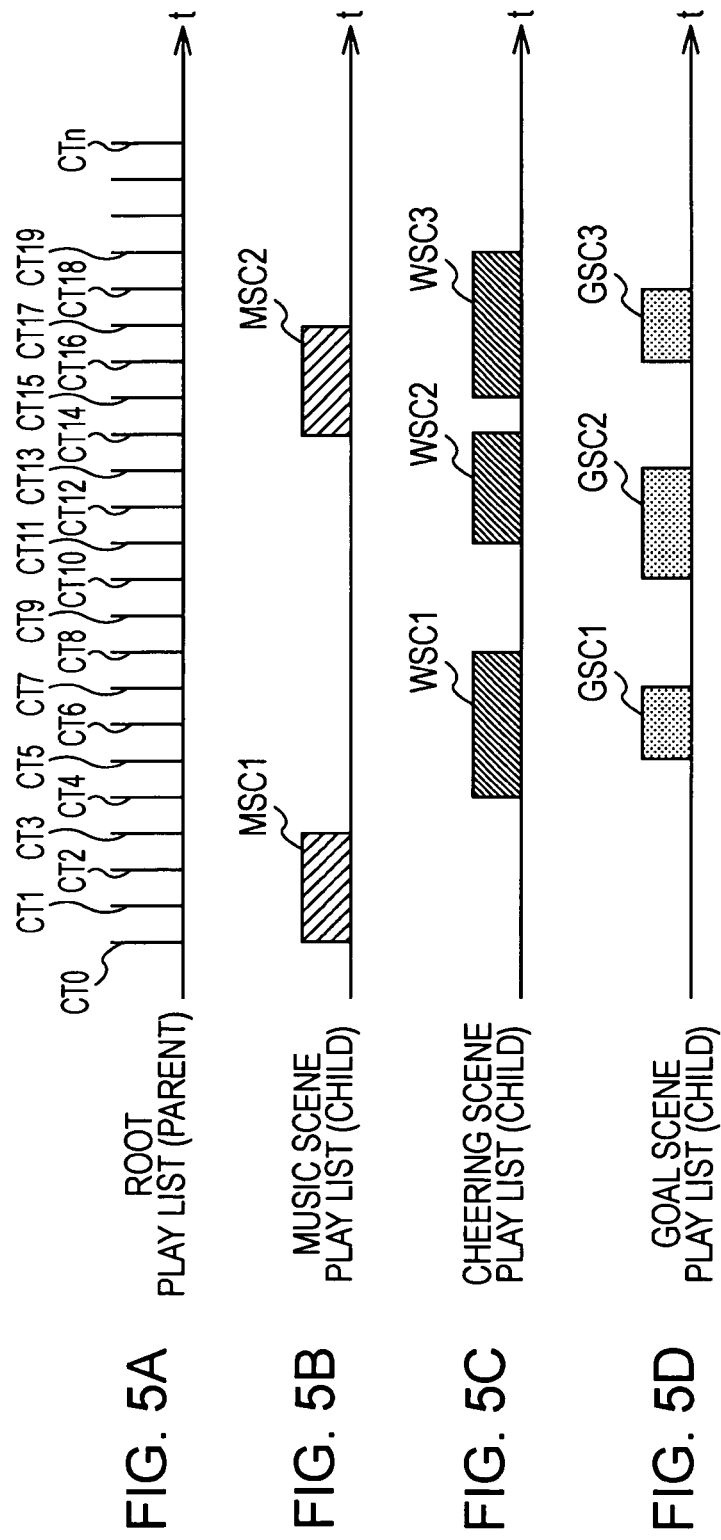

FIG. 6A ROOT PLAY LIST
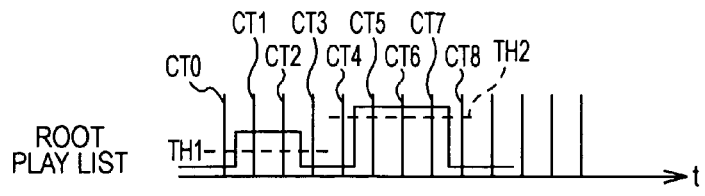
FIG. 6B MUSIC SCENE PLAY LIST
FIG. 6C CHEERING SCENE PLAY LIST
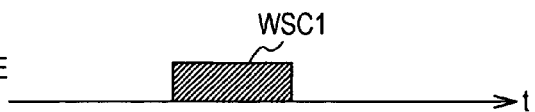
FIG. 7
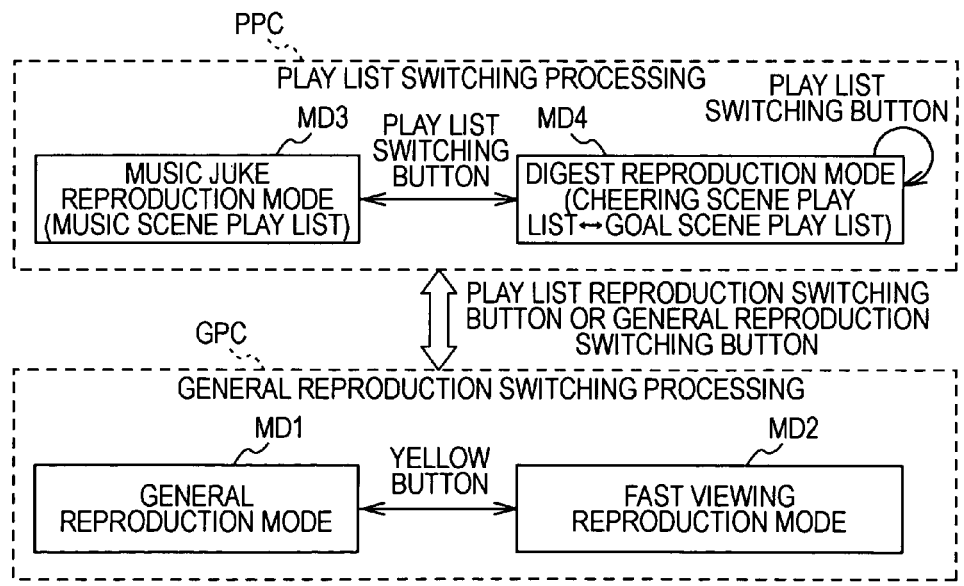

FIG. 8A  TITLE 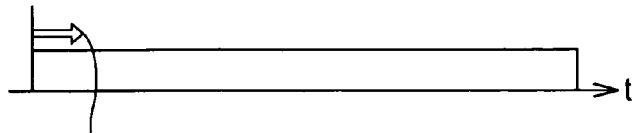
FIG. 8B  CHEERING SCENE PLAY LIST 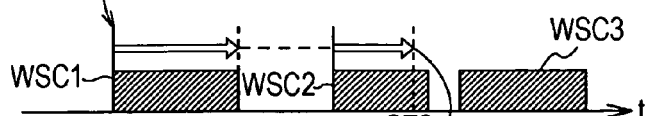
FIG. 8C  GOAL SCENE PLAY LIST 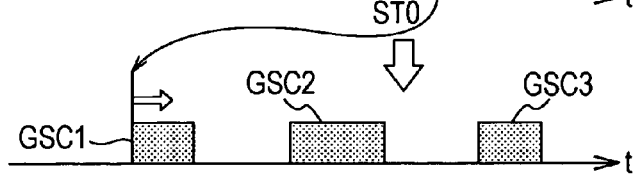
FIG. 9A  TITLE 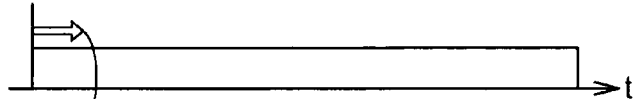
FIG. 9B  CHEERING SCENE PLAY LIST 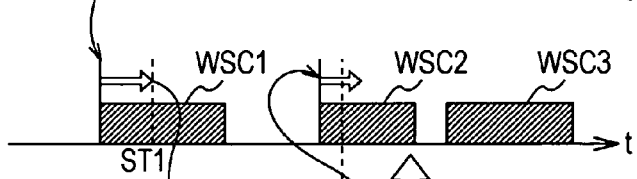
FIG. 9C  GOAL SCENE PLAY LIST 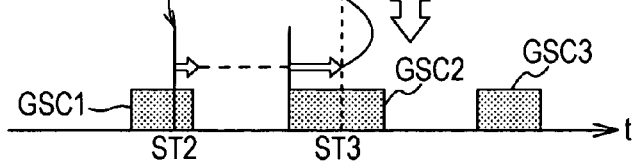

FIG. 10A  TITLE
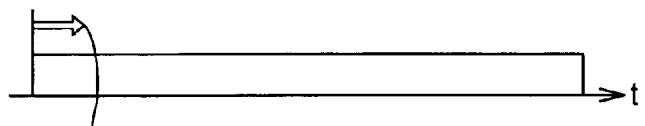
FIG. 10B  CHEERING SCENE PLAY LIST
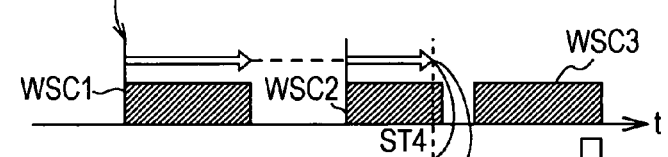
FIG. 10C  GOAL SCENE PLAY LIST

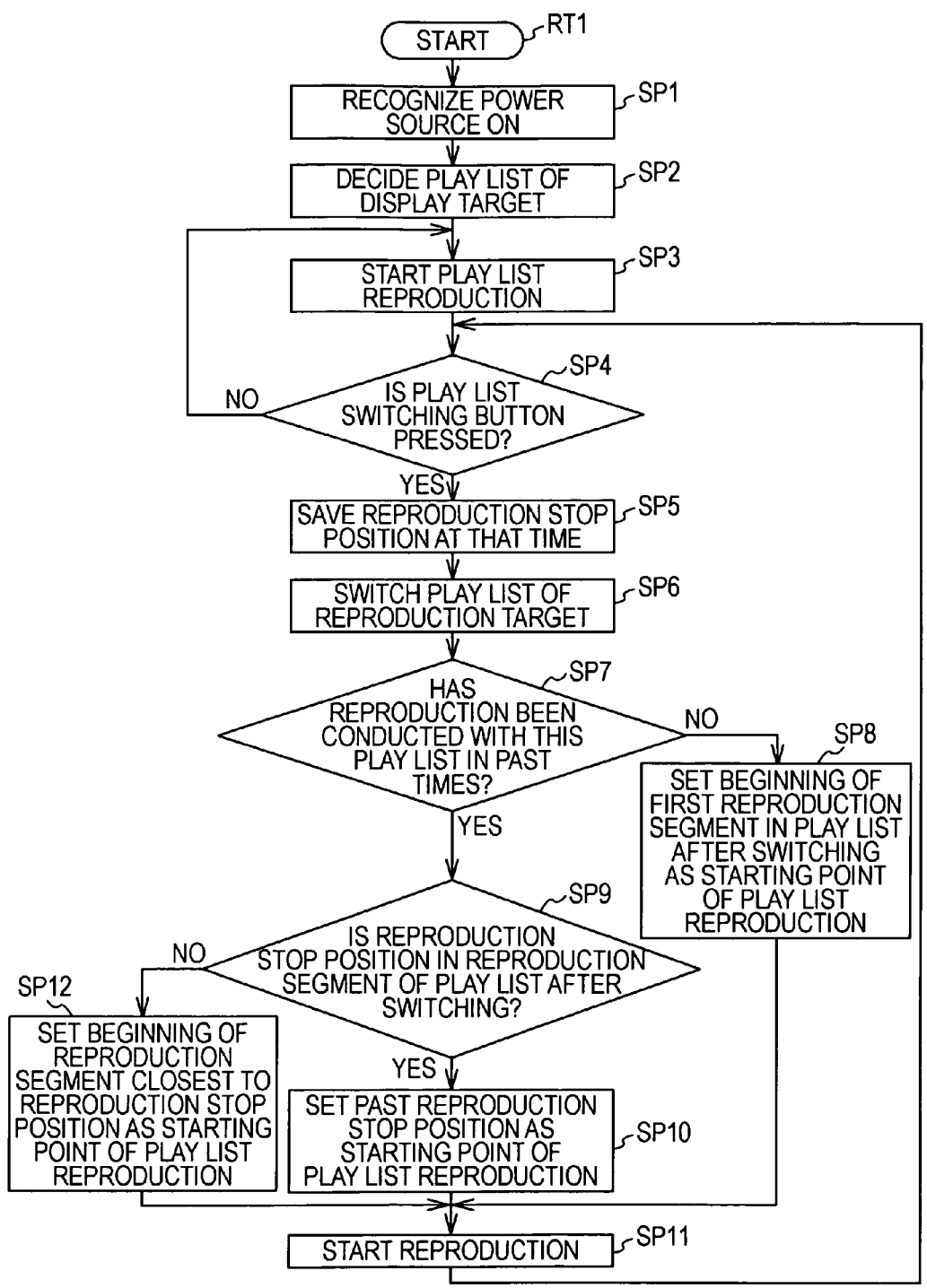

FIG. 17A  TITLE 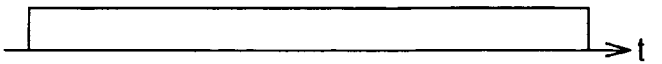
FIG. 17B  CHEERING SCENE PLAY LIST 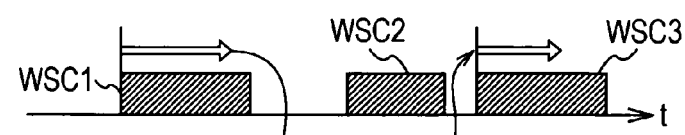
FIG. 17C  GOAL SCENE PLAY LIST 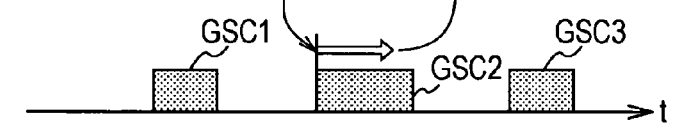
FIG. 17D  USER PLAY LIST 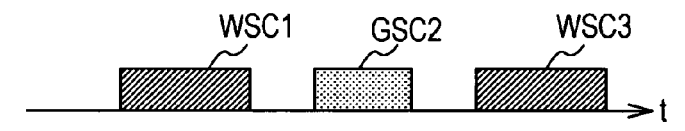
FIG. 18
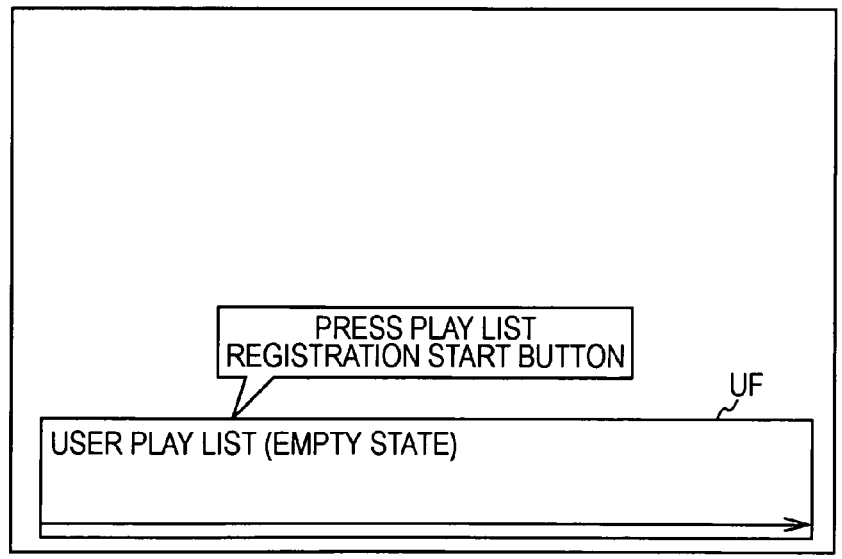

FIG. 23
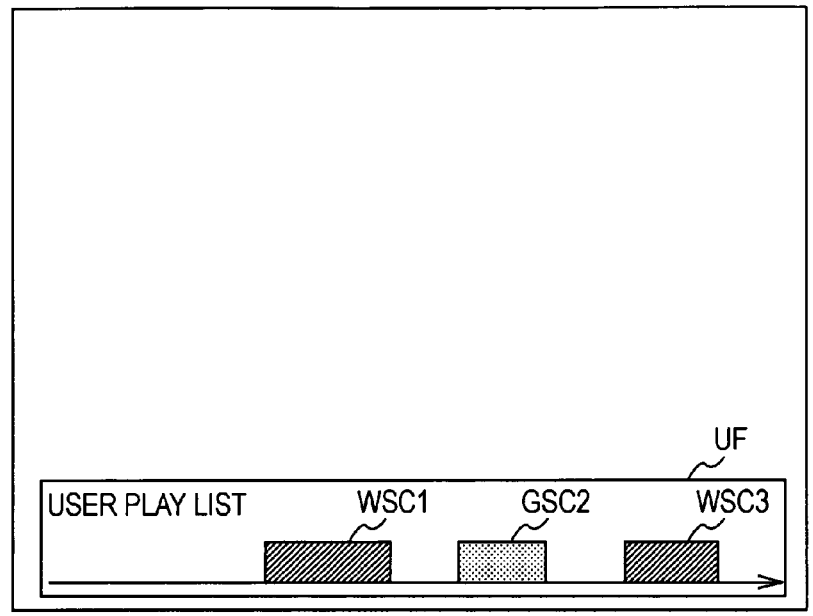
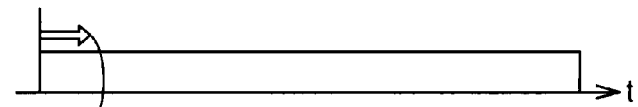
FIG. 24A  TITLE
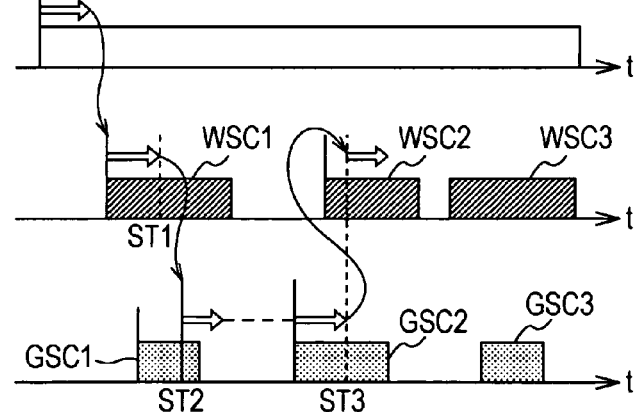
FIG. 24B  CHEERING SCENE PLAY LIST
FIG. 24C  GOAL SCENE PLAY LIST

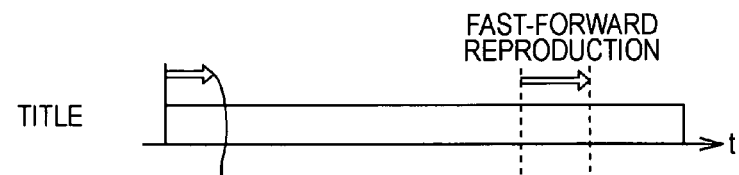
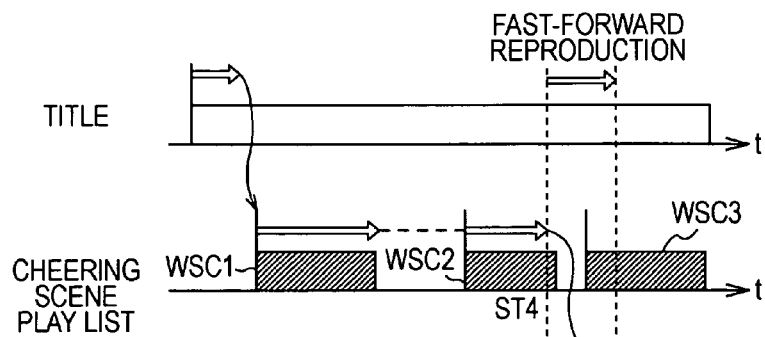
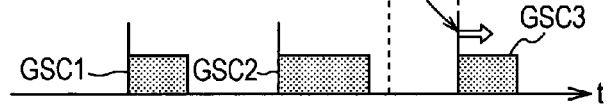
FIG. 25A TITLE
FIG. 25B CHEERING SCENE PLAY LIST
FIG. 25C GOAL SCENE PLAY LIST
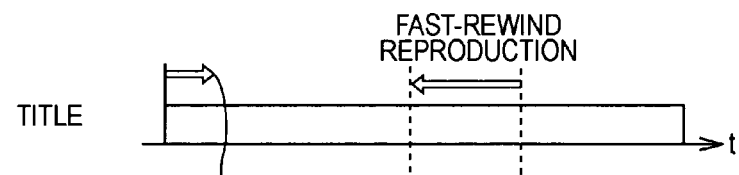
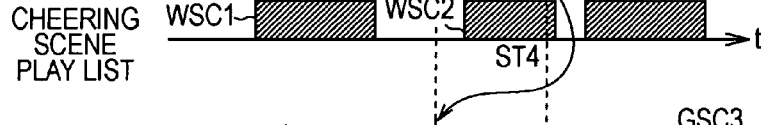
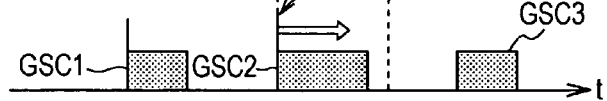
FIG. 26A TITLE
FIG. 26B CHEERING SCENE PLAY LIST
FIG. 26C GOAL SCENE PLAY LIST FIG. 27A  TITLE 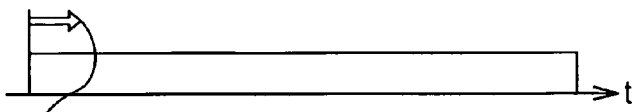
FIG. 27B  MAIN PART SCENE PLAY LIST 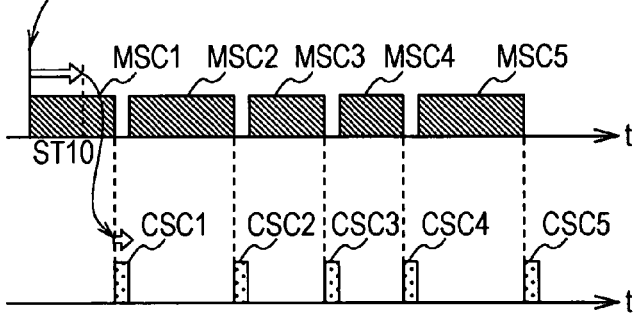
FIG. 27C  CM SCENE PLAY LIST 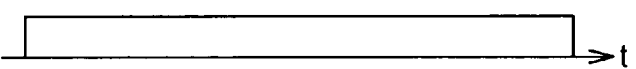
FIG. 28A  TITLE 
FIG. 28B  CHEERING SCENE PLAY LIST 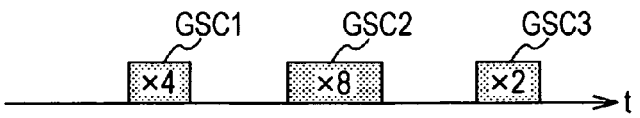
FIG. 28C  GOAL SCENE PLAY LIST 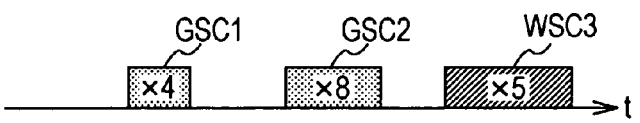
FIG. 28D  USER PLAY LIST

INFORMATION PROCESSING APPARATUS AND PLAY LIST DISPLAY METHOD

CROSS-REFERENCE TO RELATED APPLICATIONS

The present application claims priority from Japanese Patent Application No. JP 2009-163774 filed in the Japanese Patent Office on Jul. 10, 2009, the entire content of which is incorporated herein by reference.

BACKGROUND OF THE INVENTION

1. Field of the Invention

The present invention relates to an information processing apparatus and a play list display method which are suitably applied, for example, to a recording reproduction apparatus configured to record or reproduce a television program.

2. Description of the Related Art

Up to now, a recording reproduction apparatus such as, for example, a hard disc recorder configured to record a television program broadcast through television broadcasting on a hard disc drive or the like and reproduce the television program in accordance with an operation by a user is being widely used.

In such a recording reproduction apparatus, by analyzing an image signal or an audio signal of the recorded television program (hereinafter, which will be referred to as content) to detect characteristics, and by automatically setting chapters on the basis of the characteristics, commercial films and program main components are sectioned by the chapters.

Also, in the recording reproduction apparatus, while following a play list for a collection of only representative scenes identified on the basis of the characteristic of the content, a digest reproduction of the representative scenes can be carried out.

To be more specific, in the recording reproduction apparatus, for example, when the content is about a soccer match, as shown in FIG. 1A, while following a goal scene play list for a collection of only goal scenes, a digest reproduction of the goal scenes can be carried out.

Also, in the recording reproduction apparatus, as shown in FIG. 1B, it is conceivable that while following a cheering scene play list for a collection of only cheering scenes with loud cheering, a play list reproduction (digest reproduction) of the cheering scenes is carried out.

In this manner, in the recording reproduction apparatus, it is possible to generate plural types of play lists with respect to one content (the goal scene play list and the cheering scene play list) and carry out the play list reproduction (digest reproduction) by selecting the goal scene play list or the cheering scene play list in accordance with a preference of the user.

For the reference's sake, a play list search apparatus configured to extract and present a play list matching with a preference of the user among a plurality of play lists on the basis of story information indicating a transition when regarding a plurality of musical compositions included in the play list, association information on the musical compositions is viewed in the order of reproduction has been proposed (for example, Japanese Unexamined Patent Application Publication No. 2007-287256).

Incidentally, in the recording reproduction apparatus having the above-mentioned configuration, the plural types of the play lists (the goal scene play list and the cheering scene play list) are mutually independently established with respect to the one content, and as shown in FIG. 1C, in a case where both the play lists are combined to be presented, a problem occurs that the play lists are difficult to view and also are not easy for the user to utilize.

In particular, a large number of parts are displayed in a state in which reproduction segments PP1 to PP3 of the goal scene play list and reproduction segments PP11 to PP14 of the cheering scene play list are mutually overlapped in a narrow range on a time axis t (FIG. 1C), and a problem occurs that it is difficult for the user to understand.

SUMMARY OF THE INVENTION

The present invention has been made while taking into account the above-mentioned circumstances and proposes an information processing apparatus and a play list display method with which plural types of play lists useful for a user can be presented intuitively in an easily understandable manner.

In accordance with an aspect of the invention, an information processing apparatus includes a play list reproduction unit to control reproducing from a play list in one or more modes. When reproducing is switched from a first play list to a second play list, the play list reproduction unit in a first mode controls reproducing from the second play list to start from a reproduction segment of the second play list having a start time closest to a time point at which the reproducing from the first play list is stopped when the reproducing is switched from the first play list to the second play list.

In accordance with another aspect of the invention, an information processing method includes, when reproducing is switched from a first play list to a second play list, in a first mode controlling, by a processor, reproducing from the second play list to start from a reproduction segment of the second play list having a start time closest to a time point at which the reproducing from the first play list is stopped when the reproducing is switched from the first play list to the second play list.

According to an embodiment of the invention, play list reproduction may be conducted while alternately switching a reproducing play list and another play list, and also the play list where the play list reproduction is conducted may be displayed while switching, so that it is possible to allow the user to instantly recognize which play list the play list reproduction is currently conducted while following.

According to the embodiment of the present invention, as the play list reproduction may be conducted while alternately switching the reproducing play list and the another play list, and also the play list where the play list reproduction is conducted may be displayed while switching, so that it is possible to allow the user to instantly recognize which play list the play list reproduction is currently conducted while following, it is therefore possible to realize the information processing apparatus and the play list display method with which the plural type of play lists useful to the user can be presented intuitively in an easily understandable manner.

BRIEF DESCRIPTION OF THE DRAWINGS

FIGS. 1A to 1C are simplified line diagrams used for describing a handling of plural types of play lists in a related art;

FIGS. 5A to 5D are simplified line diagrams showing a root play list and various play lists;

FIGS. 6A to 6C are simplified line diagrams showing a generation method for the play list (child) from the root play list (parent);

FIG. 7 is a simplified line diagram used for describing a general reproduction switching processing and a play list reproduction switching processing;

FIGS. 8A to 8C are simplified line diagrams showing a first play list reproduction switching processing pattern;

FIGS. 9A to 9C are simplified line diagrams showing a second play list reproduction switching processing pattern;

FIGS. 10A to 10C are simplified line diagrams showing a third play list reproduction switching processing pattern;

FIG. 11 is a flow chart showing a play list reproduction switching processing procedure;

FIGS. 17A to 17D are simplified line diagrams used for describing a user play list manual generation method;

FIG. 18 is a simplified line diagram showing a user play list in an empty state;

FIG. 23 is a simplified line diagram showing a user play list generation step (5);

FIGS. 24A to 24C are simplified line diagrams showing a play list reproduction switching processing pattern (1) according to another embodiment of the present invention;

FIGS. 25A to 25C are simplified line diagrams showing a play list reproduction switching processing pattern (2) according to another embodiment of the present invention;

FIGS. 26A to 26C are simplified line diagrams showing a play list reproduction switching processing pattern (3) according to another embodiment of the present invention;

FIGS. 27A to 27C are simplified line diagrams showing a play list reproduction switching processing pattern (4) according to another embodiment of the present invention; and FIGS. 28A to 28D are simplified line diagrams used for describing a user play list automatic generation method according to another embodiment of the present invention.

DESCRIPTION OF THE PREFERRED EMBODIMENTS

Hereinafter, a description will be given of embodiments for carrying out the present invention. It should be noted that the description is carried out in the following order.

1. Embodiments
2. Other embodiments

1. Embodiments 1-1. Overall Configuration of a Recording Reproduction Apparatus

Figure 2:
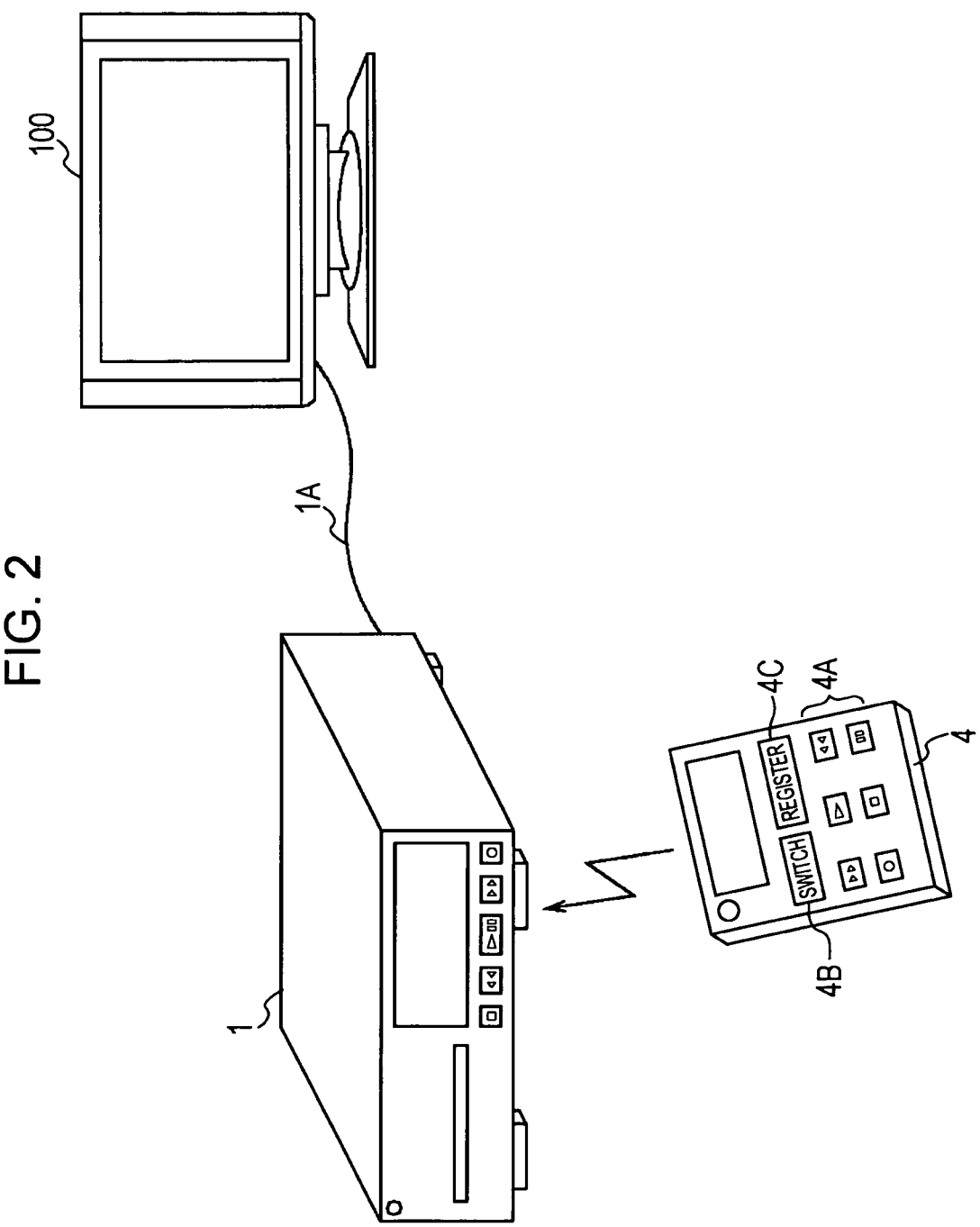
FIG. 2 is a simplified line perspective view showing an entire configuration of a recording reproduction apparatus according to an embodiment of the present invention.

As shown in FIG. 2, a recording reproduction apparatus 1 is, for example, a Blu-ray disc recorder accommodating a hard disc drive and is connected to a television receiver 100 via a HDMI (High Definition Multimedia Interface) cable 1A.

The recording reproduction apparatus 1 is configured to output a video or an audio of a content provided by broadcast which is conducted via BS (Broadcasting Satellite)/CS (Communication Satellite) digital broadcasting, terrestrial digital broadcasting, or the internet from the television receiver 100 or record the content in the hard disc drive.

Also, the recording reproduction apparatus 1 obtains and manages EPG (Electric Program Guide) data distributed from a broadcasting station via various broadcasting waves or the Internet and displays an electronic program guide based on the EPG data on the television receiver 100 in response to a request from a user. It should be noted that with respect to the respective contents, this EPG data includes information related to the content such as a content title, broadcasting date and time, a genre, and performers.

Furthermore, the recording reproduction apparatus 1 is configured to receive various commands sent by way of infrared ray in response to a press operation by the user with respect to an operation button group 4A of a remote controller and execute a predetermined processing in accordance with the various commands.

It should be noted that the remote controller 4 is provided with a play list switching button 4B and a play list registration button 4C. When the play list switching button 4B and the play list registration button 4C are pressed by the user, the play list reproduction switching processing, a user play list generation processing, and the like which will be described below are executed:

1-2. Circuit Configuration of the Recording Reproduction Apparatus

Figure 3:
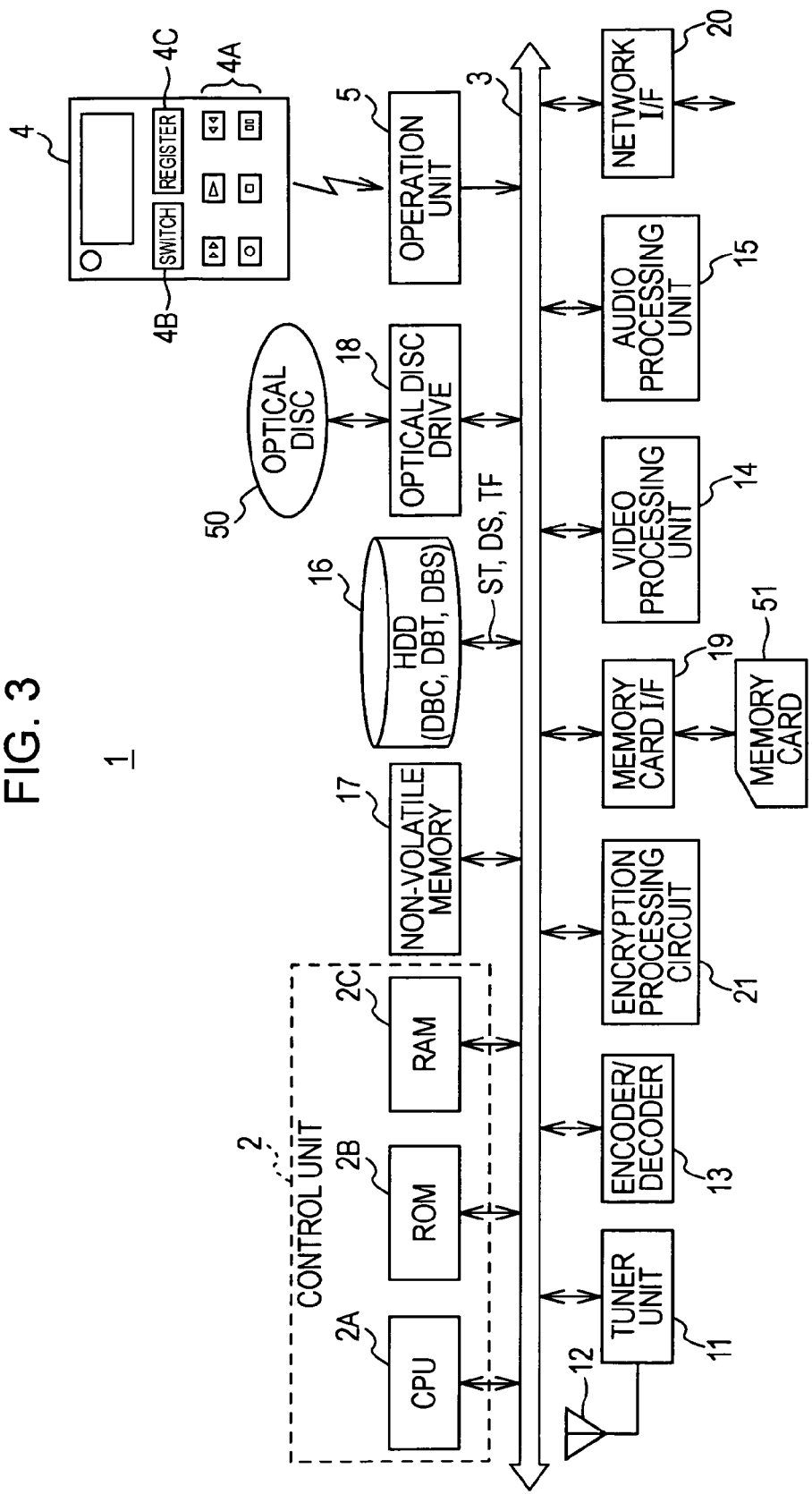
FIG. 3 is a simplified line block diagram showing a circuit configuration of the recording reproduction apparatus.

As shown in FIG. 3, the recording reproduction apparatus 1 is configured to perform an overall control on the entirety by using a control unit 2, and the control unit 2 is connected to the respective units via a bus 3. The control unit 2 is constructed around a CPU (Central Processing Unit) 2A and provided with a ROM (Read Only Memory) 2B storing various programs and a RAM (Random Access Memory) 2C utilized as a work area for the CPU 2A.

The control unit 2 is configured to be able to execute various processings such as a recording processing for a content which is a television program and a play list reproduction processing by expanding and executing a recording program, a reproduction control program, and the like read out from the ROM 2B onto the RAM 2C.

The remote controller 4 is provided with channel buttons (not shown) for specifying a broadcasting channel, the operation button group 4A, the play list switching button 4B, the play list registration button 4C, and the like and configured to send various commands in accordance with the press operation by the user on the respective buttons to the recording reproduction apparatus 1 by way of infrared signals.

An operation unit 5 receives the infrared signal sent from the remote controller 4 via a predetermined light reception unit (not shown), converts the infrared signal into an instruction command made of an electrical signal, and sends the instruction command to the control unit 2 via the bus 3. The control unit 2 is configured to execute various processings in response to the instruction command.

For example, in a case where the press operation is conducted on the channel button (not shown) of the remote controller 4, a channel instruction command for instructing the channel is sent from the operation unit 5 receiving the infrared signal to the control unit 2. In response to this command, the control unit 2 instructs the channel corresponding to the channel instruction command with respect to a tuner unit 11.

The tuner unit 11 is compatible with terrestrial digital broadcasting waves, BS digital broadcasting waves, and CS digital broadcasting waves. The tuner unit 11 selects a carrier frequency band equivalent to the channel instructed by the control unit 2 among reception signals received via an antenna 12.

Then, the tuner unit 11 applies QPSK (Quadrature Phase Shift Keying) demodulation processing, an error correcting processing, or the like on the reception signal in the selected carrier frequency band to generate a transport stream TS.

Also, the tuner unit 11 separates a video stream representing video and an audio stream representing audio among the transport stream TS and supplies these to an encoder/decoder 13 and the like. Hereinafter, for convenience sake, the video stream and the audio stream are collectively referred to as AV stream ST.

Furthermore, the tuner unit 11 separates additional information for data broadcasting such as the EPG data, copy restriction information, license information functioning as key data for encryption, and the like (hereinafter, which will be referred to as program information) among the transport stream TS to be supplied to the control unit 2.

The encoder/decoder 13 is configured to conduct a compression encoding processing and an extension decoding processing on the video data and the audio data while following a coding system such as MPEG (Motion Pictures Expert Group) system.

In actuality, the encoder/decoder 13 respectively decodes the video stream and the audio stream supplied from the tuner unit 11 to restore the video data and the audio data and respectively supplies these to a video processing unit 14 and an audio processing unit 15.

The video processing unit 14 converts the video data, for example, into an analog video signal, and further, applies a predetermined video processing to be sent to the television receiver 100 at the outside. Also, the audio processing unit 15 converts the audio data, for example, into an analog audio signal and sends this to the television receiver 100 or another audio device (not shown) or the like.

As a result, the recording reproduction apparatus 1 can allow the user to view the video and listen to the audio of the content via the television receiver 100 at the outside.

A hard disc drive (HDD) 16 has, for example, a relatively large storage capacity as large as 500 [GB] or 1 [TB] and is configured to write and read various pieces of data on the basis of the control of the control unit 2.

The control unit 2 is configured to execute a recording processing of storing the content in the hard disc drive 16 in a case where a recording button of the remote controller 4 is pressed to be operated during the reception of the content which is the television program. For the reference's sake, the control unit 2 is configured to execute a similar recording processing also in a case where a previously specified timer recording time arrives (hereinafter which will be referred to as timer recording processing).

At this time, the control unit 2 stores the AV stream ST extracted from the tuner unit 11 in the hard disc drive 16 as the recording processing.

Along with this, the control unit 2 is configured to generate the characteristic amount DS by executing a predetermined characteristic amount detection processing on the AV stream ST and store this amount in the hard disc drive 16. Herein, the characteristic amount DS is a value which is obtained, for example, by applying a predetermined analysis processing on the audio data and varies together with a reproduction time of the content, and is a value representing a degree of excitement in the content (the television program) and the switching between the scenes.

For example, the control unit 2 monitors an audio level on the basis of the audio data and can generate the characteristic amount DS by detecting a situation that the audio level exceeds a predetermined threshold.

For the reference's sake, the control unit 2 can also generate the characteristic amount DS, for example, by using a technology disclosed in WO2006/016605 A1, incorporated by reference herein.

Furthermore, with regard to the content (that is, the television program), the control unit 2 generates title information TF composed of information on a title name, a genre, a performer, and the like included in program information, a recording date and time, and the like and stores this information in the hard disc drive 16 while being associated with the content.

For the reference's sake, the hard disc drive 16 is provided with content database DBC for storing and managing the content, title database DBT for storing and managing the title information TF, and characteristic amount database DBS storing and managing the characteristic amount DS.

A non-volatile memory 17 is composed, for example, of an EEPROM (Electronically Erasable and Programmable Read Only Memory) or the like and is configured to store various programs to be executed by the CPU 2A, data used for an encryption processing and a decryption processing, and the like. For the reference's sake, the non-volatile memory 17 has a relatively small storage capacity but is configured to be able to write and read the data and the like at a faster speed than the hard disc drive 16.

An optical disc drive 18 is configured to be able to write various pieces of data on an optical disc 50 based on, for example, a BD (Blu-ray Disc, registered trademark) system and read the various pieces of data from the optical disc 50.

A memory card interface (I/F) 19 is configured to be able to write various pieces of data on a memory card 51, for example, in conformity to a standard of Memory Stick (registered trademark) and read the various pieces of data from the memory card 51.

A network interface 20 is configured to be able to communicate with an external device (not shown) via a network such as Ethernet (registered trademark) and send and receive various pieces of data.

The control unit 2 is also configured to be able to transfer or copy the content with the external device connected via the hard disc drive 16, the optical disc 50, the memory card 51, or the network interface 20 while following an instruction from the user via the remote controller 4.

At this time, the control unit 2 is configured to conduct the encryption processing and the decryption processing by an encryption processing circuit 21 used when the transfer or copy of the copyright protected content is carried out.

On the other hand, in a case where the title reproduction instruction is issued from the user, as the reproduction processing, the control unit 2 reads the AV stream ST of the content represented by the title from the hard disc drive 16 and supplies this to the encoder/decoder 13.

For the reference's sake, the control unit 2 determines that the reproduction instruction is issued when the reproduction button of the remote controller 4 is pressed to be operated in a state in which a title is selected on a title display screen or the like, and the reproduction instruction command generated by the operation unit 5 is obtained.

Similarly, as in a case where the content (the television program) is received, the encoder/decoder 13 decodes the AV stream ST, generates the video data and the audio data, and respectively supplies these to the video processing unit 14 and the audio processing unit 15.

The video processing unit 14 converts the video data, for example, into an analog video signal to be sent to the outside. Also, the audio processing unit 15 converts the audio data, for example, into an analog audio signal to be sent to the outside. According to this configuration, the recording reproduction apparatus 1 can allow the user to enjoy the video and listen to the audio of the title selected from the hard disc drive 16 via the television receiver 100 at the outside.

For the reference's sake, the control unit 2 is also configured to conduct a similar reproduction processing also in a case where the title of the content stored in the optical disc 50 or the memory card 51 is selected and the reproduction instruction is issued.

In this manner, the recording reproduction apparatus 1 is configured to store the AV stream ST, title information TI, and the characteristic amount DS in the hard disc drive 16 while being mutually associated with respect to the content (the television program) while following the operation instruction from the user.

1-3. Multi Play List Hierarchy Structure

Incidentally, when the AV stream ST of the content (the television program) is stored in the hard disc drive 16 by the recording processing, the control unit 2 of the recording reproduction apparatus 1 is configured to generate plural types of play lists depending on mutually different policies with regard to the content (hereinafter, which will be referred to as multi play list) and store this while being associated with the AV stream ST.

Herein, the play list represents a specification for a part or an entirety of the range of the AV stream ST and an instruction for reproducing only a part to be used, and the play list can be dealt with by user as the title of the content. That is, as being viewed from the user, the play list becomes a unit of the video or the audio implicitly expected where the partial reproduction of the content is continuously conducted.

Figure 4:
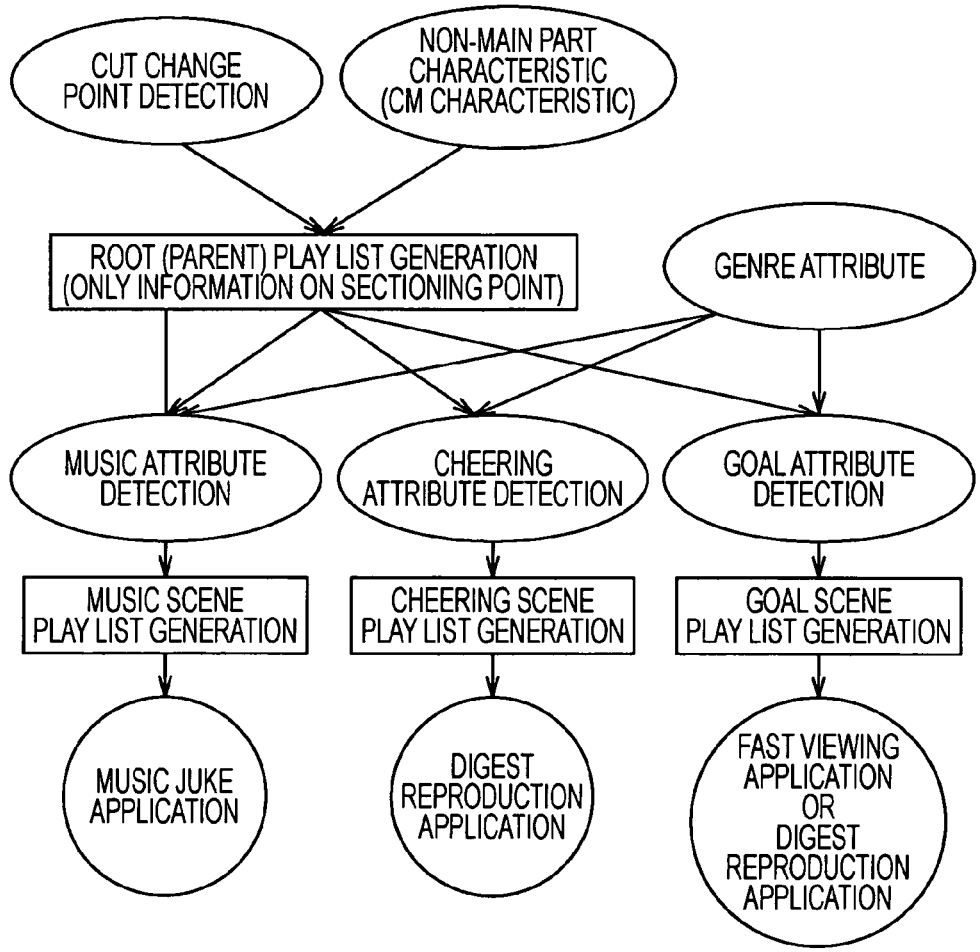
FIG. 4 is a simplified line diagram showing a multi play list hierarchy structure.

For example, as shown in FIG. 4, the control unit 2 of the recording reproduction apparatus 1 can generate a root play list shown in FIG. 5A by setting a plurality of video switching points with respect to the main part of the content, that is, cut change points as sectioning points CT0 to CTn.

For the reference's sake, the control unit 2 of the recording reproduction apparatus 1 is configured to not only set the plurality of the cut change points as the sectioning points CT0 to CTn but also in a case where the content includes commercial video other than the main part, detects a characteristic point DS of the commercial video and set the detected frame as a sectioning point CT.

Herein, the control unit 2 of the recording reproduction apparatus 1 can detect the characteristic point DS of the commercial video on the basis of silence segments for the audio in the content, a temporal interval between the silence segments, and the like and set the characteristic point as a sectioning point CT of the commercial video.

For the reference's sake, this is a technology related to a case where a commercial video in a content is detected in Japan and is not applied to a case where a commercial video in television broadcasting in the United States is detected.

This is because in the television broadcasting in the United States, the characteristic point DS of the commercial video is not correctly detected only on the basis of the detection of the silence segments like Japan, and the video segments in a plurality of fields close to an almost black level having a low luminance level which is unique to the United States should be detected.

That is, in a case a consideration is given of a US television broadcasting program, although the interval for the commercial videos is no different from a time length multiple of 15 seconds, by detecting the plurality of fields where the luminance level is at the almost black level in the starting time point and the end time point for the commercial videos, the characteristic point DS of the commercial video may be detected and set as the sectioning point CT for the commercial point CT.

By detecting, for example, the genre attributes such as the music attribute, the cheering attribute, and the goal attribute (FIG. 4) from the parent root play list, the control unit 2 of the recording reproduction apparatus 1 can generate a music scene play list, a cheering scene play list, and a goal scene play list which are children shown in FIGS. 5B, 5C, and 5D.

In the music scene play list, a reproduction segment between the sectioning points CT0 to CT3 in the root play list is generated as a first music scene MSC1, a reproduction segment between the sectioning points CT14 to CT17 in the root play list is generated as a second music scene MSC2.

In the cheering scene play list, a reproduction segment between the sectioning points CT4 to CT8 in the root play list is generated as a first cheering scene WSC1, a reproduction segment CT11 to CT14 between the sectioning points in the root play list is generated as a second cheering scene WSC2, and a reproduction segment between the sectioning points CT15 to CT19 in the root play list is generated as a third cheering scene WSC3.

In the goal scene play list, a reproduction segment between the sectioning points CT5 to CT7 in the root play list is generated as a first goal scene GSC1, a reproduction segment between the sectioning points CT10 to CT13 in the root play list is generated as a second goal scene GSC2, and a reproduction segment between the sectioning points CT16 to CT18 in the root play list is generated as a third goal scene GSC3.

Herein, as shown in FIGS. 6A and 6B, in the music scene play list, as the characteristic amount of the image or the audio in the reproduction segment between the sectioning points CT0 to CT3 in the root play list exceeds a predetermined threshold level TH1, the reproduction segment between the sectioning points CT0 to CT3 is set as the first music scene MSC1.

Also, as shown in FIGS. 6A and 6C, in the cheering scene play list, as the characteristic amount of the image or the audio in the reproduction segment between the sectioning points CT4 to CT8 in the root play list exceeds a predetermined threshold level TH2, the reproduction segment between the sectioning points CT4 to CT8 is set as the first cheering scene WSC1.

It should be noted that although not shown in the drawing, similarly, in the goal scene play list, as the characteristic amount of the image or the audio in the reproduction segment between the sectioning points CT5 to CT7 in the root play list exceeds a predetermined threshold level, the reproduction segment between the sectioning points CT5 to CT7 is set as the first goal scene GSC1.

The thus generated music scene play list (FIG. 4) is supplied, for example, to the music juke application which is suitable to continuously reproduce only the music scenes by using the music scene play list.

Similarly, the cheering scene play list (FIG. 4) is supplied, for example, to the digest reproduction application which is suitable to continuously reproduce only the cheering scenes by using the cheering scene play list, and the goal scene play list is supplied, for example, to the fast viewing application which is suitable to continuously reproduce only the goal scenes by using the goal scene play list.

For the reference's sake, the goal scene play list (FIG. 4) may be supplied to the digest reproduction application which is suitable to continuously reproduce only the goal scenes by using the goal scene play list. In this case, in the digest reproduction application, it is possible to carry out the digest reproduction by selecting any of the cheering scene play list and the goal scene play list.

1-4. General Reproduction Switching Processing and Play List Reproduction Switching Processing As shown in FIG. 7, the control unit 2 of the recording reproduction apparatus 1 is configured to switch a general reproduction switching processing GPC and a play list reproduction switching processing PPC in accordance with a press operation on the play list switching button 4B or the general reproduction switching button (not shown) of the remote controller 4.

To be more specific, in accordance with a press operation, for example, on a yellow button (not shown) allocated as the general reproduction switching button of the remote controller 4, the control unit 2 of the recording reproduction apparatus 1 can switch a mode from a general reproduction mode MD1 for normally reproducing the content to a fast viewing reproduction mode MD2.

After that, in accordance with the repeated press operation on the yellow button of the remote controller 4, the control unit 2 of the recording reproduction apparatus 1 can switch the mode from the fast viewing reproduction mode MD2 to the general reproduction mode MD1.

Herein, the general reproduction mode MD1 is a mode for continuously reproducing the content from the beginning to the end through a normal reproduction method, and on the other hand, the fast viewing reproduction mode MD2 is a mode for partially reproducing the content while skipping at a predetermined time interval.

Incidentally, while the general reproduction switching processing GPC on the content is conducted in the general reproduction mode MD1 or the fast viewing reproduction mode MD2, when the control unit 2 of the recording reproduction apparatus 1 confirms that the play list switching button 4B of the remote controller 4 is pressed to be operated, the processing is shifted from the general reproduction switching processing GPC to the play list reproduction switching processing PPC.

In a case where the processing is shifted to the play list reproduction switching processing PPC, when the music scene play list, the cheering scene play list, and the goal scene play list are previously generated with respect to the content and stored in the hard disc drive 16 (FIG. 4), the control unit 2 of the recording reproduction apparatus 1 first reads out the music scene play list, the cheering scene play list and the goal scene play list.

Then, the control unit 2 of the recording reproduction apparatus 1 shifts the mode to a music juke reproduction mode MD3 using the music scene play list through the music juke application or a digest reproduction mode MD4 using the cheering scene play list or the goal scene play list through the digest reproduction application.

For example, in a case where the music juke reproduction mode MD3 using the music scene play list through the music juke application is set, when the control unit 2 of the recording reproduction apparatus 1 confirms that the play list switching button 4B of the remote controller 4 is pressed to be operated, the mode is shifted to the digest reproduction mode MD4 using the cheering scene play list or the goal scene play list through the digest reproduction application.

Then, in a case where the digest reproduction mode MD4 using the cheering scene play list or the goal scene play list through the digest reproduction application is set, when the control unit 2 of the recording reproduction apparatus 1 confirms that the play list switching button 4B of the remote controller 4 is pressed to be operated, the mode is shifted to the digest reproduction mode MD4 using the goal scene play list or the cheering scene play list.

In this case, in the digest reproduction mode MD4, in accordance with the press operation on the play list switching button 4B, the control unit 2 of the recording reproduction apparatus 1 can alternately switch the digestion reproduction based on any of the cheering scene play list and the goal scene play list.

After that, in the digest reproduction mode MD4, when the control unit 2 of the recording reproduction apparatus 1 switches both of the digest reproduction using the cheering scene play list and the digest reproduction using the goal scene play list and then confirms that the play list switching button 4B is pressed to be operated, the mode is shifted to the music juke reproduction mode MD3 using the music scene play list through the music juke application.

It should be noted that while the play list reproduction switching processing on the content is carried out in the music juke reproduction mode MD3 or the digest reproduction mode MD4, when the control unit 2 of the recording reproduction apparatus 1 confirms that the general reproduction switching button (not shown) of the remote controller 4 is pressed to be operated, the processing is returned from the play list reproduction switching processing PPC to the general reproduction switching processing GPC.

1-5. Play List Reproduction Switching Processing

Subsequently, a specific description will be given of the play list reproduction switching processing carried out when the control unit 2 of the recording reproduction apparatus 1 alternately switches the play list reproduction using the cheering scene play list (digest reproduction) and the play list reproduction using the goal scene play list (digest reproduction) in the digest reproduction mode MD4.

It should be noted that the play list reproduction switching processing carried out when the control unit 2 of the recording reproduction apparatus 1 alternately switches the music juke reproduction using the music scene play list and the digest reproduction using the cheering scene play list and the play list reproduction switching processing carried out when the control unit 2 of the recording reproduction apparatus 1 alternately switches the music juke reproduction using the music scene play list and the digest reproduction using the goal scene play list are basically similar, so that a description thereof will be omitted for the sake of simplicity.

1-5-1. First Play List Reproduction Switching Processing

As shown in FIG. 8A, while the content having a certain title is reproduced in the general reproduction mode MD1, when the play list switching button 4B of the remote controller 4 is pressed to be operated, the control unit 2 of the recording reproduction apparatus 1 carries out the next processing.

In this case, as shown in FIGS. 8A and 8B, the reproduction position jumps to the beginning of the first cheering scene WSC1 which is the reproduction segment in the cheering scene play list to shift the mode to the digest reproduction mode MD4, and the control unit 2 of the recording reproduction apparatus 1 starts the play list reproduction only for the cheering scenes (digest reproduction).

Then, the play list reproduction is started from the beginning of the first cheering scene WSC1 in the cheering scene play list, and currently, while the play list reproduction is conducted with respect to the second cheering scene WSC2, when the play list switching button 4B of the remote controller 4 is pressed to be operated, the control unit 2 of the recording reproduction apparatus 1 carries out the next processing.

At this time, as shown in FIGS. 8B and 8C, the control unit 2 of the recording reproduction apparatus 1 stops the play list reproduction with respect to the second cheering scene WSC2 and also carries out the next processing after a time code at a reproduction stop position ST0 is recorded.

In a case where the play list reproduction is not conducted with respect to the goal scene play list at the switching destination in past times, the reproduction position jumps from the reproduction stop position ST0 for the second cheering scene WSC2 to the beginning of the first goal scene GSC1 in the goal scene play list, and the control unit 2 of the recording reproduction apparatus 1 starts the play list reproduction (digest reproduction) from that position.

In this manner, as shown in FIGS. 8B and 8C, the control unit 2 of the recording reproduction apparatus 1 is configured to be able to switch the reproduction from the play list reproduction only for the cheering scenes using the cheering scene play list (digest reproduction) to the play list reproduction only for the goal scenes using the goal scene play list (digest reproduction) in accordance with the press operation on the play list switching button 4B of the remote controller 4.

1-5-2. Second Play List Reproduction Switching Processing

As shown in FIG. 9A, while the content having a certain title is reproduced in the general reproduction mode MD1, when the play list switching button 4B of the remote controller 4 is pressed to be operated, the control unit 2 of the recording reproduction apparatus 1 carries out the next processing.

In this case, as shown in FIGS. 9A and 9B, the reproduction position jumps to the beginning of the first cheering scene WSC1 which is the reproduction segment in the cheering scene play list to shift the mode to the digest reproduction mode MD4, and the control unit 2 of the recording reproduction apparatus 1 starts the play list reproduction only for the cheering scenes (digest reproduction).

Then, while the play list reproduction is conducted from the beginning of the first cheering scene WSC1 in the cheering scene play list, when the play list switching button 4B of the remote controller 4 is pressed to be operated, the control unit 2 of the recording reproduction apparatus 1 carries out the next processing.

At this time, as shown in FIGS. 9B and 9C, the control unit 2 of the recording reproduction apparatus 1 stops the play list reproduction with respect to the first cheering scene WSC1 and also carries out the next processing after a time code at a reproduction stop position ST1 is recorded.

In a case where the reproduction stop position ST1 corresponds to the first cheering scene WSC1 which is the reproduction segment in the cheering scene play list at the switching destination and also a reproduction stop position ST2 of the first goal scene GSC1 exists where the play list reproduction with respect to the goal scene play list has been stopped in past times, the reproduction position jumps to the reproduction stop position ST2, and the control unit 2 of the recording reproduction apparatus 1 resumes the play list reproduction only for the goal scenes (digest reproduction) from the mid-flow.

After that, the play list reproduction is resumed from the reproduction stop position ST2 for the first goal scene GSC1 in the goal scene play list (digest reproduction), and then during the play list reproduction of the second goal scene GSC2, when the play list switching button 4B of the remote controller 4 is pressed to be operated, the control unit 2 of the recording reproduction apparatus 1 carries out the next processing.

In this case, as shown in FIGS. 9C and 9B, the control unit 2 of the recording reproduction apparatus 1 stops the play list reproduction of the second goal scene GSC2 and also stores a time code at a reproduction stop position ST3.

After that, in a case where the reproduction stop position ST3 corresponds to the reproduction segment in the cheering scene play list at the switching destination but a reproduction stop position where the play list reproduction with respect to the cheering scene play list has been stopped in past times does not exist, the reproduction position jumps to the beginning of the second cheering scene WSC2 which is the reproduction segment, and the control unit 2 of the recording reproduction apparatus 1 is configured to resume the play list reproduction (digest reproduction) from that position.

In this manner, as shown in FIGS. 9B and 9C, the control unit 2 of the recording reproduction apparatus 1 is configured to be able to alternately switch the play list reproduction only for the cheering scenes using the cheering scene play list (digest reproduction) and the play list reproduction only for the goal scenes using the goal scene play list (digest reproduction) to enable the reproduction resuming from the vicinity of the reproduction stop positions ST1 and ST3 in accordance with the press operation on the play list switching button 4B of the remote controller 4.

1-5-3. Third Play List Reproduction Switching Processing

As shown in FIG. 10A, while the content having a certain title is reproduced in the general reproduction mode MD1, when the play list switching button 4B of the remote controller 4 is pressed to be operated, the control unit 2 of the recording reproduction apparatus 1 carries out the next processing.

In this case, as shown in FIGS. 10A and 10B, the reproduction position jumps to the beginning of the first cheering scene WSC1 in the cheering scene play list to shift the mode to the digest reproduction mode MD4, the control unit 2 of the recording reproduction apparatus 1 starts the play list reproduction only for the cheering scenes (digest reproduction).

Then, the play list reproduction is started from the beginning of the first cheering scene WSC1 in the cheering scene play list, and currently, while the play list reproduction is conducted up to the mid-flow of the second cheering scene WSC2, when the play list switching button 4B of the remote controller 4 is pressed to be operated, the control unit 2 of the recording reproduction apparatus 1 carries out the next processing.

In this case, as shown in FIGS. 10B and 10C, the control unit 2 of the recording reproduction apparatus 1 stops the play list reproduction at the mid-flow of the second cheering scene WSC2 and also stores a time code at a reproduction stop position ST4.

Then, the control unit 2 of the recording reproduction apparatus 1 determines whether or not the time code at the reproduction stop position ST4 is overlapped with any of the first goal scene GSC1 to the third goal scene GSC3 which are the reproduction segments in the goal scene play list.

At this time, as the reproduction stop position ST4 in the cheering scene play list is not overlapped with any of the first goal scene GSC1 to the third goal scene GSC3 which are the reproduction segments in the goal scene play list, the control unit 2 of the recording reproduction apparatus 1 carries out the next processing.

The reproduction position jumps to the beginning of the third goal scene GSC3 which is the reproduction segment closest from the reproduction stop position ST4 on the future side or the reproduction position jumps to the beginning of the second goal scene GSC2 which is the reproduction segment closest from the reproduction stop time point on the past side, the control unit 2 of the recording reproduction apparatus 1 starts the play list reproduction only for the goal scenes (digest reproduction) from that position.

In this manner, as shown in FIGS. 10B and 10C, in accordance with the press operation on the play list switching button 4B of the remote controller 4, when the reproduction is switched from the play list reproduction only for the cheering scenes using the cheering scene play list (digest reproduction) to the play list reproduction only for the goal scenes using the goal scene play list (digest reproduction), the reproduction position jumps to the reproduction segment on the immediate future side or the past side from the reproduction stop position ST4, and the control unit 2 of the recording reproduction apparatus 1 is configured to start the play list reproduction.

1-5-4. Play List Reproduction Switching Processing Procedure

Subsequently, a play list reproduction switching processing carried out by the control unit 2 of the recording reproduction apparatus 1 described above by using a first play list reproduction switching processing pattern or a second play list reproduction switching processing pattern will be specifically described on the basis of a flow chart of FIG. 11.

The control unit 2 of the recording reproduction apparatus 1 enters a start step at routine RT1 and shifts to the next step SP1, and when it is recognized that the user turns ON a power supply, the control unit shifts to the next step SP2.

In step SP2, the control unit 2 of the recording reproduction apparatus 1 decides a play list which is a display target that is selected by via the remote controller 4 and should be executed, for example, as the cheering scene play list and the goal scene play list and shifts to the next step SP3.

In step SP3, the control unit 2 of the recording reproduction apparatus 1 starts the play list reproduction following the cheering scene play list or the goal scene play list decided in step SP2 and shifts to the next step SP4.

Herein, the control unit 2 of the recording reproduction apparatus 1 starts the play list reproduction by using any one of the cheering scene play list and the goal scene play list previously selected by the user. It should be however noted that the configuration is not limited to this, and as a default setting, the control unit 2 of the recording reproduction apparatus 1 may start the play list reproduction by using the play list having older play list generation date and time.

In actuality, the control unit 2 of the recording reproduction apparatus 1 starts the play list reproduction (that is, digest reproduction), for example, by continuously reproducing only the first cheering scene WSC1 to the third cheering scene WSC3, . . . , which are the reproduction segments in the cheering scene play list.

Figure 12:
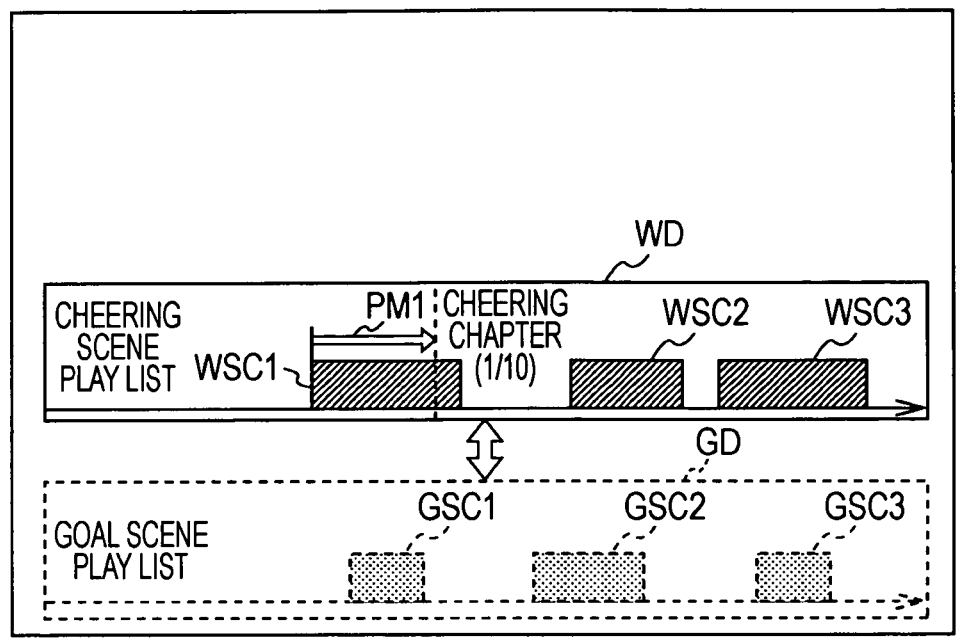
FIG. 12 is a simplified line diagram showing a play list reproduction switching display example (1)

At this time, simultaneously, as shown in FIG. 12, the control unit 2 of the recording reproduction apparatus 1 displays a cheering scene play list display frame WD corresponding to the cheering scene play list on the screen of the television receiver 100 to visually demonstrate a state to the user in which currently, the play list reproduction based on the cheering scene play list is being executed.

In the cheering scene play list display frame WD, the cheering scene play list is displayed, and a state in which the play list reproduction of the first cheering scene WSC1 is currently conducted is represented by a reproduction mark PM1 made of an arrow mark. Also, a state in which the first cheering scene WSC1 is equivalent to the first cheering chapter among the ten cheering chapters is represented by a text display "cheering chapter (1/10)".

It should be noted that the control unit 2 of the recording reproduction apparatus 1 is configured to also display a goal scene play list display frame GD in the goal scene play list which is not the target of the play list reproduction at this moment but may become the target of the play list reproduction in accordance with the press operation on the play list switching button 4B in such a display mode that the user can vaguely check by the eyes (illustrated by the broken line).

According to this configuration, the control unit 2 of the recording reproduction apparatus 1 is configured to be able to allow the user to intuitively recognize that not only the cheering scene play list displayed in the goal scene play list display frame GD where the play list reproduction is currently conducted but also the goal scene play list exist as the switching destination of the play list reproduction by the goal scene play list display frame GD.

In step SP4, the control unit 2 of the recording reproduction apparatus 1 determines whether or not the play list switching button 4B of the remote controller 4 is pressed to be operated while the play list reproduction with respect to the first cheering scene WSC1 to the third cheering scene WSC3, . . . , is executed while following the cheering scene play list.

At that time, when the negative result is obtained, this represents that during the execution of the play list reproduction following the cheering scene play list, the play list switching button 4B of the remote controller 4 is not pressed to be operated, and at this time, the control unit 2 of the recording reproduction apparatus 1 returns to step SP3 to continuously executes the play list reproduction following the cheering scene play list.

In contrast to this, when the positive result is obtained in step SP4, this represents that during the execution of the play list reproduction following the cheering scene play list, the play list switching button 4B of the remote controller 4 is pressed to be operated, and at this time, the control unit 2 of the recording reproduction apparatus 1 shifts to the next step SP5.

In step SPS, the control unit 2 of the recording reproduction apparatus 1 stops the play list reproduction following the cheering scene play list when the play list switching button 4B is pressed to be operated, saves a time code indicating the reproduction stop position ST in the RAM 2C, and shifts to the next step SP6.

In step SP6, the control unit 2 of the recording reproduction apparatus 1 switches the reproduction target play list from the cheering scene play list to the goal scene play list in accordance with the press operation on the play list switching button 4B and shifts to the next step SP7.

In step SP7, the control unit 2 of the recording reproduction apparatus 1 determines whether or not the goal scene play list at the switching destination has been reproduced in the passed time. At that time, when the negative result is obtained, this represents that the goal scene play list has not been reproduced yet, and at this time, the control unit 2 of the recording reproduction apparatus 1 returns to the next step SP8.

In step SP8, as shown in FIGS. 8A to 8C, the control unit 2 of the recording reproduction apparatus 1 sets the starting point as the beginning of the first goal scene GSC1 which is the first reproduction segment in the goal scene play list at the switching destination from the reproduction stop position ST0 in the cheering scene play list and shifts to the next step SP11.

In contrast to this, when the positive result is obtained in step SP7, this represents that the play list reproduction has been conducted by using the goal scene play list in past times, and at this time, the control unit 2 of the recording reproduction apparatus 1 shifts to the next step SP9.

In step SP9, the control unit 2 of the recording reproduction apparatus 1 determines whether or not the reproduction stop position ST when the play list reproduction following the cheering scene play list is stopped is overlapped with any of the reproduction segments in the goal scene play list at the switching destination.

At this time, when the positive result is obtained, this represents, for example, that the reproduction stop position ST1 (FIG. 9B) when the play list reproduction following the cheering scene play list is stopped corresponds to the first goal scene GSC1 of the reproduction segments in the goal scene play list at the switching destination, and at this time, the control unit 2 of the recording reproduction apparatus 1 shifts to the next step SP10.

In step SP10, the control unit 2 of the recording reproduction apparatus 1 sets the past reproduction stop position ST2 of the first goal scene GSC1 in the goal scene play list at the switching destination as the starting point when the play list reproduction is resumed while following the goal scene play list and shifts to the next step SP11.

In step SP11, the reproduction position jumps to the starting point of the play list reproduction set in step SP8 or SP10, and the control unit 2 of the recording reproduction apparatus 1 switches the play list from the cheering scene play list to the goal scene play list to start the play list reproduction. After that, the control unit 2 of the recording reproduction apparatus 1 returns to step SP4 again to repeatedly carry out the subsequent processings.

Figure 13:
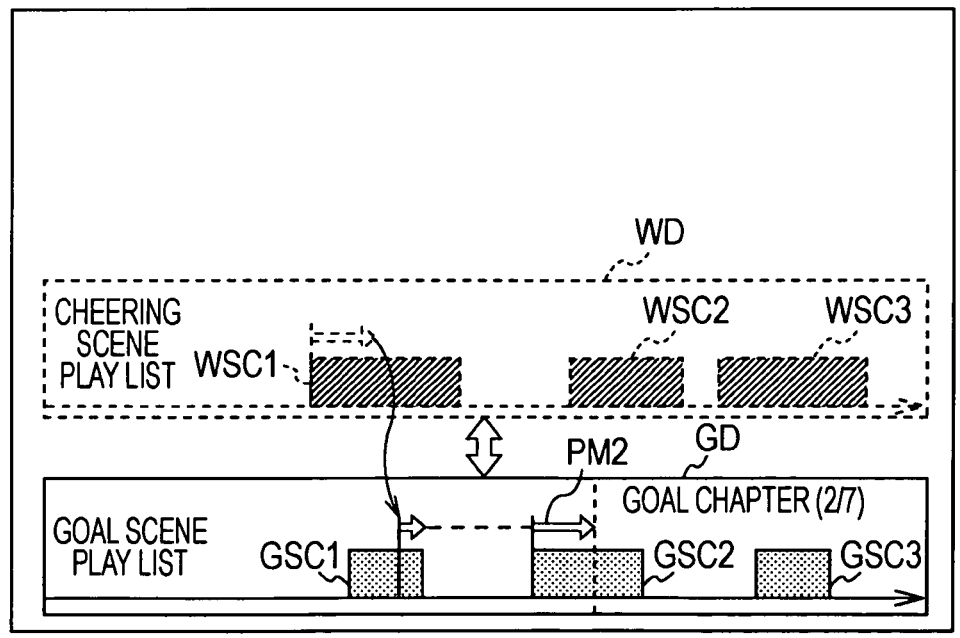
FIG. 13 is a simplified line diagram showing a play list reproduction switching display example (2)

At this time, as shown in FIG. 13, on the screen of the television receiver 100, the control unit 2 of the recording reproduction apparatus 1 changes the cheering scene play list display frame WD corresponding to the cheering scene play list in such a display mode that the user can vaguely check by the eyes (illustrated by the broken line) and also displays the goal scene play list display frame GD.

According to this configuration, the control unit 2 of the recording reproduction apparatus 1 is configured to visually demonstrate a state to the user in which currently, the reproduction is switched from the play list reproduction based on the cheering scene play list to the play list reproduction based on the goal scene play list and is being executed.

In the goal scene play list display frame GD, the goal scene play list is displayed, and, for example, a state in which the play list reproduction of the second goal scene GSC2 is currently conducted is represented by a reproduction mark PM2 made of an arrow mark. Also, a state in which the second goal scene GSC2 is equivalent to the second cheering chapter among the seven goal chapters in total is represented by a text display "goal chapter (2/7)".

On the other hand, when the negative result is obtained in step SP9, this represents, for example, that the reproduction stop position ST4 (FIG. 10B) when the play list reproduction following the cheering scene play list is stopped does not correspond to any of the second goal scene GSC2 and the third goal scene GSC3 which are the reproduction segments in the goal scene play list at the switching destination, and at this time, the control unit 2 of the recording reproduction apparatus 1 returns to the next step SP12.

In step SP12, for example, as the reproduction stop position ST4 (FIG. 10B) when the play list reproduction following the cheering scene play list is stopped does not correspond to any of the second goal scene GSC2 and the third goal scene GSC3 which are the reproduction segments in the goal scene play list at the switching destination, the control unit 2 of the recording reproduction apparatus 1 sets the beginning of the second goal scene GSC2 or the third goal scene GSC3 which is the reproduction segment on the past side closest to the reproduction stop position ST4 or the future side as the starting point for resuming the play list reproduction and shifts to the next step SP11.

In step SP11, the reproduction position jumps to the starting point of the play list reproduction set in step SP12 to start the play list reproduction, and thereafter the control unit 2 of the recording reproduction apparatus 1 returns to step SP4 again to repeatedly conduct the subsequent processings.

Figure 14:
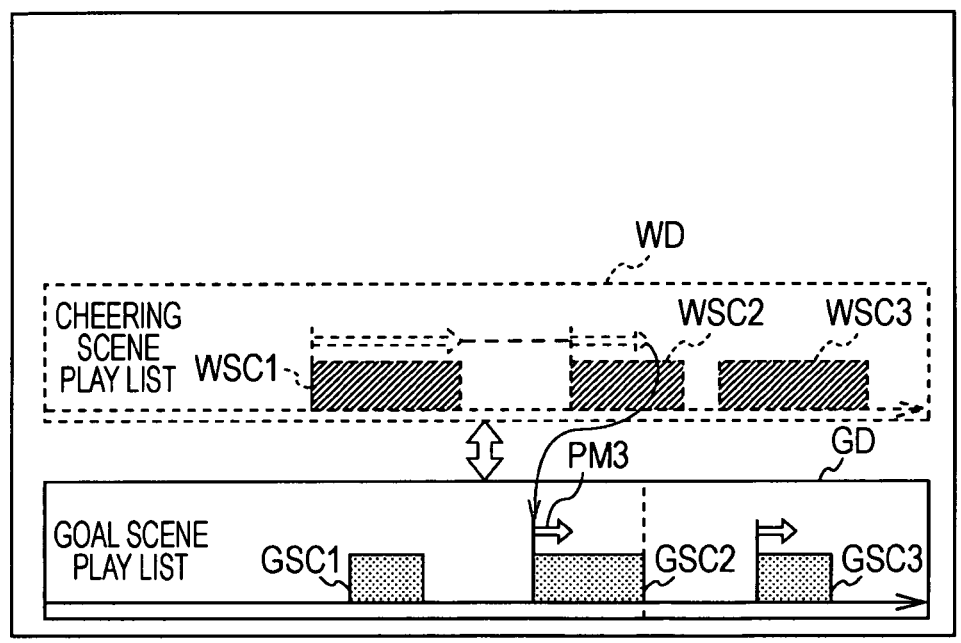
FIG. 14 is a simplified line diagram showing a play list reproduction switching display example (3)

At this time, as shown in FIG. 14, on the screen of the television receiver 100, the control unit 2 of the recording reproduction apparatus 1 changes the cheering scene play list display frame WD corresponding to the cheering scene play list in such a display mode that the user can vaguely check by the eyes (illustrated by the broken line) and also displays the goal scene play list display frame GD.

According to this configuration, the control unit 2 of the recording reproduction apparatus 1 is configured to visually demonstrate a state to the user in which currently, the reproduction is switched from the play list reproduction based on the cheering scene play list to the play list reproduction based on the goal scene play list and is being executed.

In the goal scene play list display frame GD, the goal scene play list is displayed, and, for example, a state in which the play list reproduction of the second goal scene GSC2 is currently conducted is represented by a reproduction mark PM3 made of an arrow mark. Also, a state in which the second goal scene GSC2 is equivalent to the second cheering chapter among the seven goal chapters in total is represented by a text display "goal chapter (2/7)".

In this manner, the control unit 2 of the recording reproduction apparatus 1 is configured to be able to alternately switch the play list reproduction based on the cheering scene play list and the play list reproduction based on the goal scene play list by using any of the first play list reproduction switching processing pattern to a third play list reproduction switching processing pattern.

At that time, when the play list reproduction based on the cheering scene play list and the play list reproduction based on the goal scene play list are switched, as shown in FIGS. 12 to 14, the control unit 2 of the recording reproduction apparatus 1 mainly displays the cheering scene play list display frame WD or the goal scene play list display frame GD in the play list reproduction, so that it is possible to allow the user to instantly understand which play list is used.

Then, when the play list reproduction up to the third cheering scene WSC3 or the third goal scene GSC3 which is the last reproduction segment is ended, the control unit 2 of the recording reproduction apparatus 1 is configured to automatically return to the first cheering scene WSC1 or the first goal scene GSC1 which is the first reproduction segment and repeatedly execute the play list reproduction from the beginning.

This is because when the play list reproduction is ended, trouble for the user to issue a command for resuming the play list reproduction again is omitted, and this is effective when the number of reproduction segments set in the cheering scene play list or the goal scene play list is small, and the play list reproduction ends in a short period of time.

It should be noted that for the sake of simplicity, the case of switching the cheering scene play list and the goal scene play list has been described as an example, but a case of switching the cheering scene play list and the music scene play list and a case of switching the goal scene play list and the music scene play list are also similar, and a description will be omitted herein.

1-6. User Play List Generation Method

Next, regarding the control unit 2 of the recording reproduction apparatus 1, a description will be given of a user play list automatic generation method of automatically generating a user play list unique to the user on the basis of a reproduction history created when the play list generation is executed while the cheering scene play list and the goal scene play list are switched.

Also, regarding the control unit 2 of the recording reproduction apparatus 1, not only the user play list automatic generation method, but also a user play list manual generation method of directly manually generating a user play list unique to the user on the basis of an operation result created when the play list reproduction is executed while the cheering scene play list and the goal scene play list are manually switched at an arbitrary timing will be subsequently described.

1-6-1. User Play List Automatic Generation Method

Figure 15:
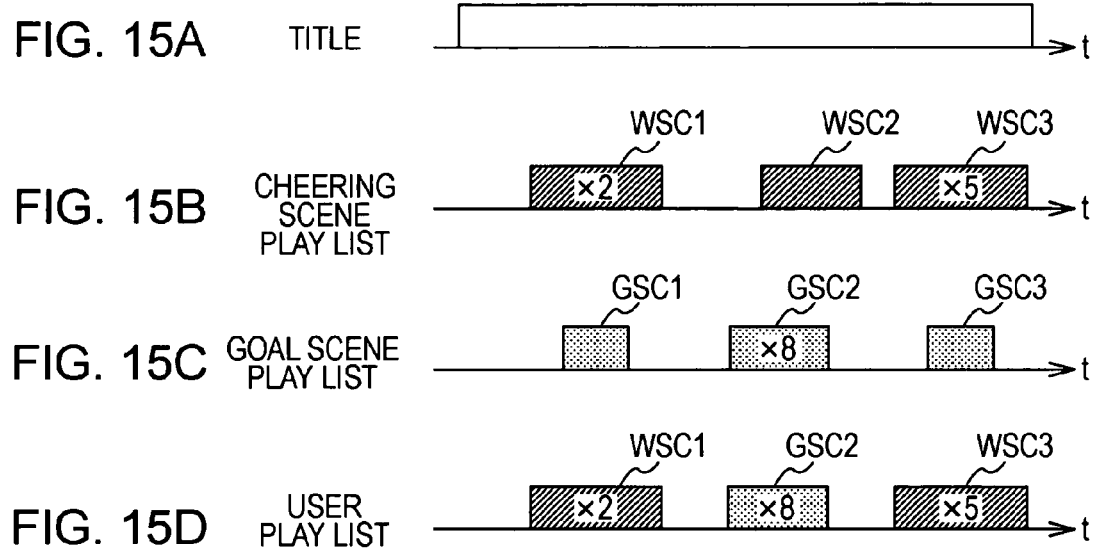
FIGS. 15A to 15D are simplified line diagrams used for describing a user play list automatic generation method.

As shown in FIGS. 15A to 15C, the control unit 2 of the recording reproduction apparatus 1 is configured to count the generation of which reproduction segment at which frequency when the reproduction is repeatedly conducted by several or more times while the cheering scene play list previously generated with respect to the content having a certain title and the goal scene play list are actually switched.

As a result, the control unit 2 of the recording reproduction apparatus 1 holds a state in which the first cheering scene WSC1 which is the first reproduction segment in the cheering scene play list is reproduced by two times and the third cheering scene WSC3 is reproduced by five times as a reproduction history with respect to the cheering scene play list.

Also, the control unit 2 of the recording reproduction apparatus 1 holds a state in which the second goal scene GSC2 which is the second reproduction segment in the goal scene play list is reproduced by eight times as a reproduction history with respect to the goal scene play list.

Then, the control unit 2 of the recording reproduction apparatus 1 is configured to extract the reproduction segments where the reproduction is conducted by at least two times among the cheering scene play list and the goal scene play list and arrange those on the time axis to automatically generate a user play list obtained by gathering and combining the reproduction segments shown in FIG. 15D where the reproduction is frequently conducted by the user.

This user play list is generated by arranging the reproduction segment of the first cheering scene WSC1 in the cheering scene play list, the reproduction segment of the second goal scene GSC2 in the goal scene play list, and the reproduction segment of the third cheering scene WSC3 in the cheering scene play list on the time axis.

In this manner, the control unit 2 of the recording reproduction apparatus 1 is configured to be able to generate the reproduction history by repeatedly executing the play list reproduction while the cheering scene play list and the goal scene play list are alternately switched and automatically generate the user play list by using this reproduction history without user's awareness.

Figure 16:
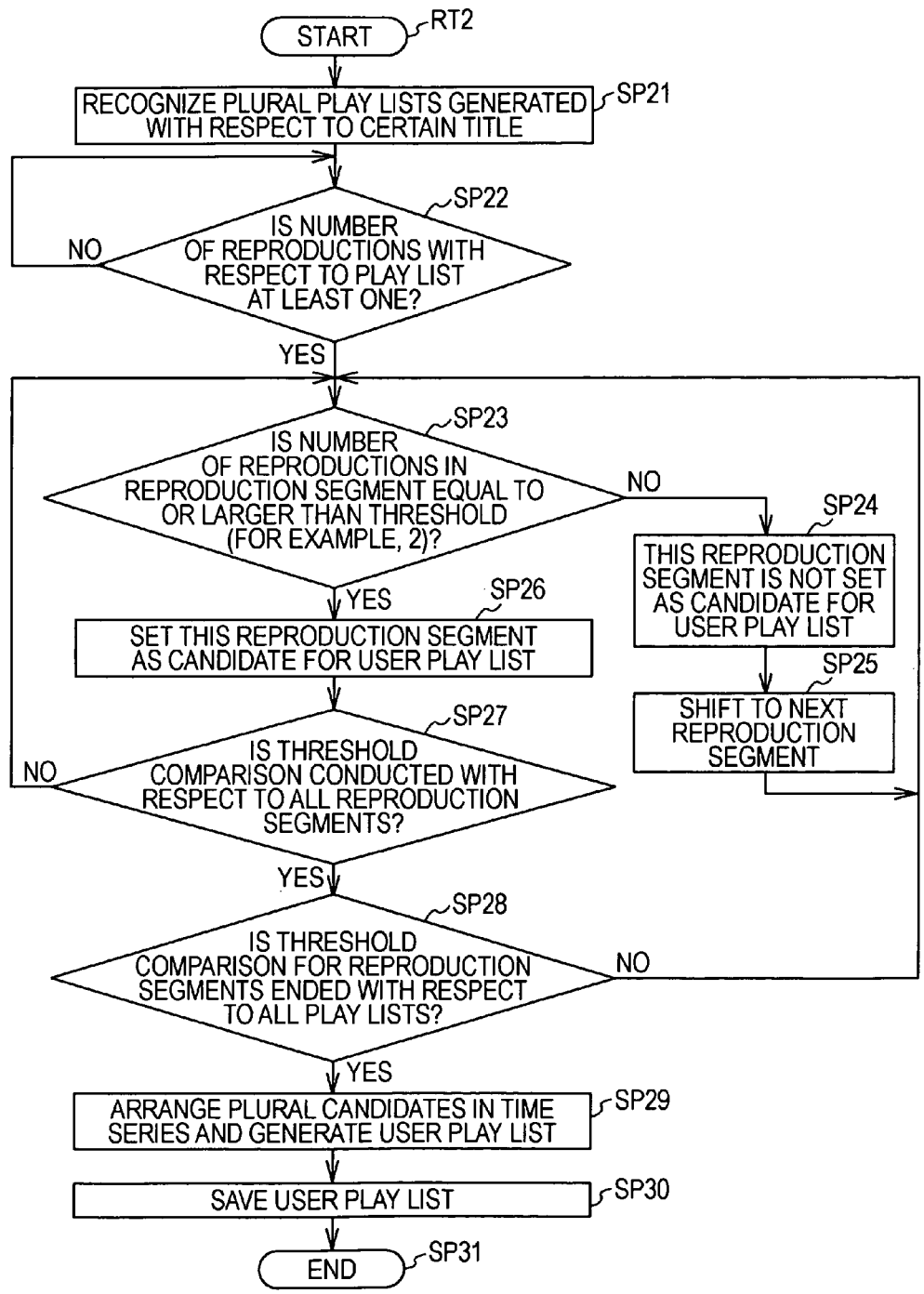
FIG. 16 is a flow chart showing a user play list automatic generation processing procedure.

In actuality, as shown in FIG. 16, the control unit 2 of the recording reproduction apparatus 1 enters the start step of routine RT2 to shift to the next step SP21 and recognizes a plurality of play lists which are the play list reproduction targets which are previously generated with respect to the content having a certain title to shift to the next step SP22.

In step SP22, the control unit 2 of the recording reproduction apparatus 1 focuses on an arbitrary play list among the plurality of play lists (for example, the cheering scene play list and the goal scene play list) and determines whether or not the number of reproductions conducted with respect to the play list is at least one.

At that time, when the negative result is obtained, this represents that as no play list reproduction is conducted with respect to the play list, when the user play list is automatically generated, the reproduction history of the play list is not referred to, and at this time, the control unit 2 of the recording reproduction apparatus 1 returns to step SP22.

In step SP22, the control unit 2 of the recording reproduction apparatus 1 repeatedly conducts the processing in step SP22 until the play list whose number of reproductions is at least one is detected among the plurality of play lists.

In contrast to this, when the positive result is obtained in step SP22, this represents that the number of reproductions conducted with respect to the play list is at least one, and the play list is useful to be referred to when the user play list is automatically generated. At this time, the control unit 2 of the recording reproduction apparatus 1 shifts to the next step SP23.

In step SP23, the control unit 2 of the recording reproduction apparatus 1 determines whether or not the number of reproductions conducted with respect to the reproduction segment in the play list is equal to or larger than a predetermined threshold (for example, two times). At that time, when the negative result is obtained, this represents that the reproduction segment is not relevant to the reproduction segment where the user preferably conducts the play list reproduction on numerous occasions, and at this time, the control unit 2 of the recording reproduction apparatus 1 shifts to the next step SP24.

In step SP24, as the reproduction segment is not relevant to the reproduction segment where the user preferably conducts the play list reproduction on numerous occasions, the control unit 2 of the recording reproduction apparatus 1 shifts to the next step SP25 without setting this as a candidate of the user play list.

In step SP25, in order to verify the next reproduction segment with respect to the play list, the control unit 2 of the recording reproduction apparatus 1 shifts to the next reproduction segment and thereafter returns to step SP23 again.

In contrast to this, when the positive result is obtained in step SP23, this represents that the number of reproductions conducted with respect to the reproduction segment in the play list is equal to or larger than the predetermined threshold (for example, two times), and the reproduction segment is a reproduction segment where the user preferably conducts the play list reproduction on numerous occasions. At this time, the control unit 2 of the recording reproduction apparatus 1 shifts to the next step SP26.

In step SP26, as the reproduction segment is a reproduction segment where the user preferably conducts the play list reproduction on numerous occasions, the control unit of the recording reproduction apparatus 1 sets this as a candidate for a user play list to be newly generated and thereafter shifts to the next step SP27.

In step SP27, the control unit 2 of the recording reproduction apparatus 1 determines whether or not the threshold comparison in step SP23 is performed with respect to all the reproduction segments in the play list. In a case where the negative result is obtained, the control unit 2 of the recording reproduction apparatus 1 returns to step SP23 to repeatedly carry out the subsequent processings.

In contrast to this, when the positive result is obtained in step SP27, this represents that the threshold comparison in step SP23 is ended with respect to all the reproduction segments in the play list, and the setting of all the reproduction segments which become the candidates of the user play list is ended. At this time, the control unit 2 of the recording reproduction apparatus 1 shifts to the next step SP28.

In step SP28, the control unit 2 of the recording reproduction apparatus 1 determines whether or not the threshold comparison for the reproduction segments is ended with respect to all the play lists. In a case where the negative result is obtained, the control unit 2 of the recording reproduction apparatus 1 returns to step SP23 and repeatedly carries out the subsequent processings to perform the threshold comparison with respect to the next play list.

In contrast to this, when the positive result is obtained in step SP28, this represents that the threshold comparison for the reproduction segments with respect to the plurality of play lists recognized in step SP21 is ended, and the setting of all the candidates for the user play lists is completed. At this time, the control unit 2 of the recording reproduction apparatus 1 shifts to the next step SP29.

In step SP29, the control unit 2 of the recording reproduction apparatus 1 generates such a user play list (FIG. 17D) that the cheering scene play list and the goal scene play list are mixed by arranging the plurality of reproduction segments set as the candidates for the user play list from the cheering scene play list and the goal scene play list on the time series order and shifts to the next step SP30.

That is, the user play list is constituted by arranging the reproduction segments in the reproduction segment of the first cheering scene WSC1 in the cheering scene play list, the reproduction segment of the second goal scene GSC2 in the goal scene play list, and the third cheering scene WSC3 in the cheering scene play list on the time series order.

In step SP30, the control unit 2 of the recording reproduction apparatus 1 saves the user play list generated in step SP29 in the hard disc drive 16 and thereafter shifts to the next step SP31 to end the processing.

In this manner, the control unit 2 of the recording reproduction apparatus 1 is configured to be able to automatically generate the user play list in which only the reproduction segments frequently reproduced in the plurality of play lists are arranged on the time series order by using the reproduction history without user's awareness.

1-6-2. User Play List Manual Generation Method

As shown in FIGS. 17A to 17C, during the play list reproduction conducted with respect to the first cheering scene WSC1 in the cheering scene play list previously generated with respect to the content having a certain title, in accordance with the press operation on the play list switching button 4B of the remote controller 4, the control unit 2 of the recording reproduction apparatus 1 switches the reproduction target to the second goal scene GSC2 in the goal scene play list.

After that, the control unit 2 of the recording reproduction apparatus 1 switches the reproduction target from the second goal scene GSC2 in the goal scene play list to the third cheering scene WSC3 in the cheering scene play list in accordance with the repeated press operation on the play list switching button 4B.

At this time, the control unit 2 of the recording reproduction apparatus 1 is configured to manually generate a new user play list which is matched with a preference of the user each time the play list reproduction is conducted while switching the cheering scene play list and the goal scene play list, by arranging the first cheering scene WSC1, the second goal scene GSC2 and the third cheering scene WSC3 which are the reproduction segments where the play list reproduction is conducted in the time series manner.

A generation processing until the user play list is generated in accordance with such a play list switching operation by the user will be specifically described by using subsequent FIGS. 18 to 23.

In actuality, the control unit 2 of the recording reproduction apparatus 1 enters a user play list manual generation mode in response to the operation by the user via the remote controller 4, and as shown in FIG. 18, as a state is that the user play list is not yet generated, an empty user play list presentation frame UF is displayed on the screen of the television receiver 100.

Figure 19:
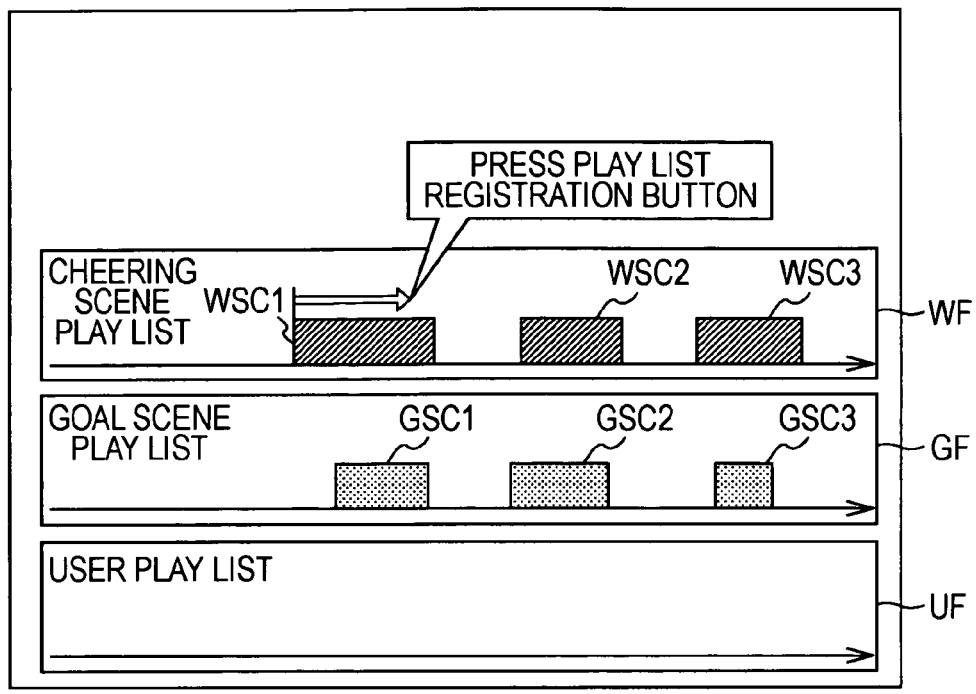
FIG. 19 is a simplified line diagram showing a user play list generation step (1)

When the content that should be subjected to the play list reproduction is selected, as shown in FIG. 19, the control unit 2 of the recording reproduction apparatus 1 displays a cheering scene play list presentation frame WF corresponding to the cheering scene play list previously generated with respect to the content and a goal scene play list presentation frame GF corresponding to the goal scene play list.

In this case, the control unit 2 of the recording reproduction apparatus 1 displays the cheering scene play list presentation frame WF and the goal scene play list presentation frame GF on the user play list presentation frame UF so as to be overlapped.

During the play list reproduction of the first cheering scene WSC1 which is the first reproduction segment in the cheering scene play list, in accordance with the press operation by the user with respect to the play list registration button 4C of the remote controller 4 (FIG. 19), the control unit 2 of the recording reproduction apparatus 1 sets the first cheering scene WSC1 as the candidate for the user play list.

Figure 20:
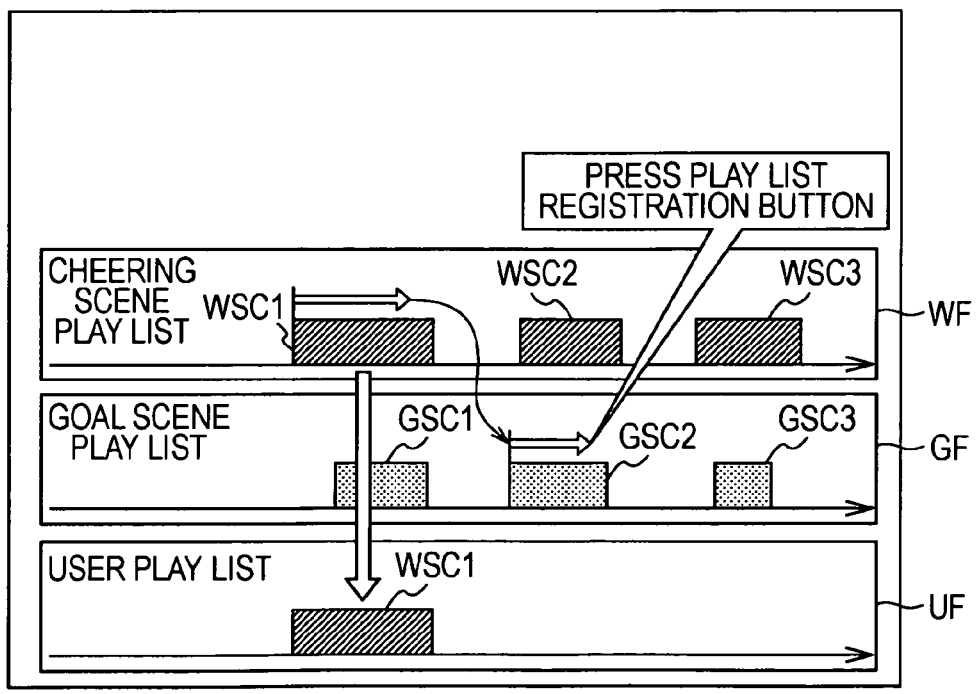
FIG. 20 is a simplified line diagram showing a user play list generation step (2)

At this time, as shown in FIG. 20, the control unit 2 of the recording reproduction apparatus 1 is configured to be able to allow the user to check the generation step for the user play list by the eyes via the user play list presentation frame UF by displaying the first cheering scene WSC1 set as the candidate for the user play list in the user play list presentation frame UF.

After that, with the control unit 2 of the recording reproduction apparatus 1, the reproduction target jumps from the first cheering scene WSC1 in the cheering scene play list to the second goal scene GSC2 in the goal scene play list in accordance with the press operation by the user with respect to the play list switching button 4B of the remote controller 4.

The control unit 2 of the recording reproduction apparatus 1 sets the second goal scene GSC2 as the candidate for the user play list during the play list reproduction of the second goal scene GSC2 in the goal scene play list in accordance with the press operation by the user with respect to the play list registration button 4C of the remote controller 4 (FIG. 20).

Figure 21:
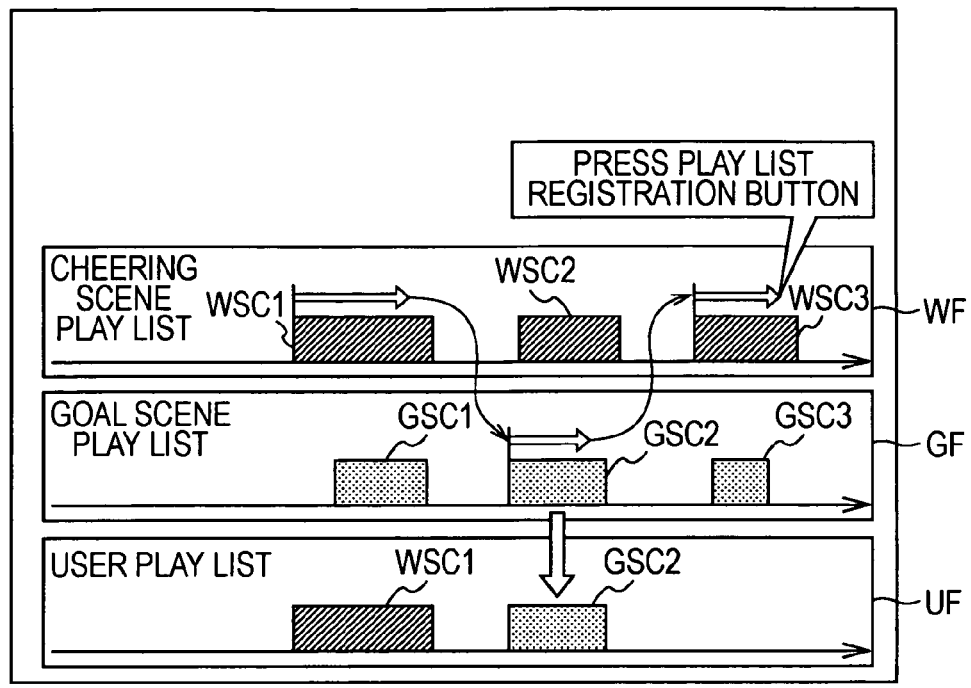
FIG. 21 is a simplified line diagram showing a user play list generation step (3)

At this time too, as shown in FIG. 21, the control unit 2 of the recording reproduction apparatus 1 is configured to be able to allow the user to check the generation step for the user play list by the eyes via the user play list presentation frame UF by displaying the second goal scene GSC2 set as the candidate for the user play list on the user play list presentation frame UF after the first cheering scene WSC1.

Incidentally, as the play list reproduction switching processing pattern in this case, in accordance with the press operation on the play list switching button 4B, when the reproduction segments of the cheering scene play list and the goal scene play list are switched, in order that the same reproduction segments are not overlapped in the time series manner, the play list reproduction is executed while regularly jumping to the reproduction segment towards the future side by one.

Subsequently, with the control unit 2 of the recording reproduction apparatus 1, the reproduction target jumps from the second goal scene GSC2 in the goal scene play list to the third cheering scene WSC3 in the cheering scene play list in accordance with the press operation by the user with respect to the play list switching button 4B of the remote controller 4.

The control unit 2 of the recording reproduction apparatus 1 sets the third cheering scene WSC3 as the candidate for the user play list during the play list reproduction of the third cheering scene WSC3 in the cheering scene play list in accordance with the press operation by the user with respect to the play list registration button 4C of the remote controller 4 (FIG. 21).

Figure 22:
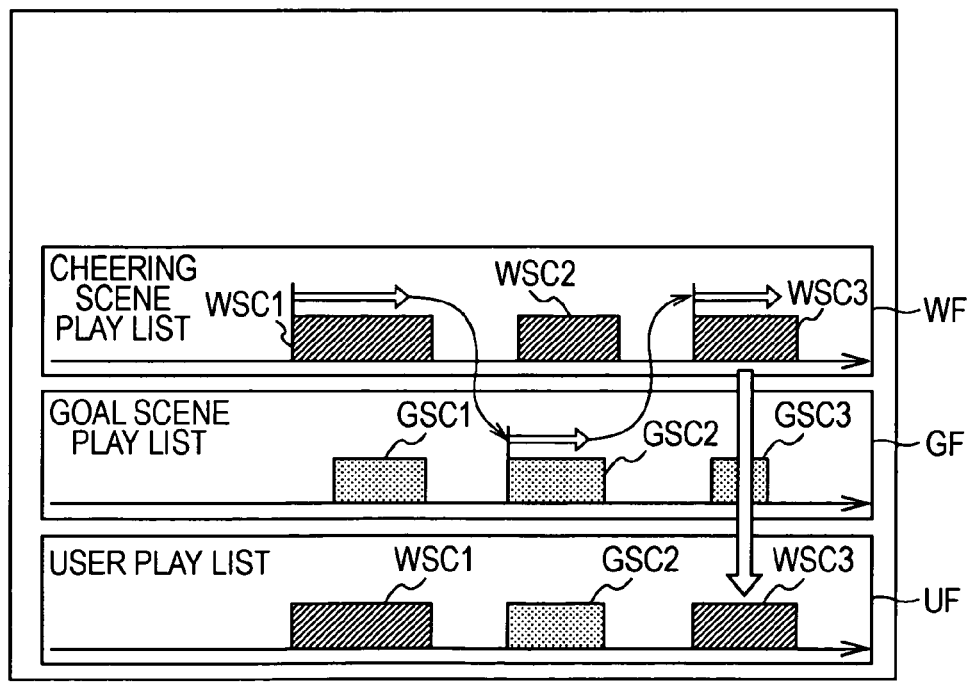
FIG. 22 is a simplified line diagram showing a user play list generation step (4)

In this case too, as shown in FIG. 22, the control unit 2 of the recording reproduction apparatus 1 is configured to be able to allow the user to check the generation step for the user play list by the eyes via the user play list presentation frame UF by displaying the third cheering scene WSC3 set as the candidate for the user play list in the user play list presentation frame UF after the first cheering scene WSC1 and the second goal scene GSC2.

In this manner, when the play list reproduction with respect to the cheering scene play list or the goal scene play list is ended, the control unit 2 of the recording reproduction apparatus 1 is configured to complete the user play list obtained by arranging the first cheering scene WSC1, the second goal scene GSC2 and the third cheering scene WSC3 in the time series manner which are equivalent to the reproduction segments set as the candidates for the user play list so far and saves this user play list in the hard disc drive 16.

Then, as shown in FIG. 23, the control unit 2 of the recording reproduction apparatus 1 is configured to be able to allow the user to intuitively recognize that the generation of the user play list is ended by displaying the thus completed user play list in the user play list presentation frame UF and on the other hand removing from the display the cheering scene play list presentation frame WF and the goal scene play list presentation frame GF.

In this manner, the control unit 2 of the recording reproduction apparatus 1 is configured to generate the user play list by using only the reproduction segments where the play list reproduction is actually conducted each time the play list reproduction is conducted while actually switching the cheering scene play list and the goal scene play list previously generated with respect to the content having a certain title.

1-7. Operations and Effects

In the above-mentioned configuration, the control unit 2 of the recording reproduction apparatus 1 executes the play list reproduction while following the cheering scene play list or the goal scene play list generated on the basis of the plural types of attributes with respect to the content having a certain title.

At that time, in accordance with the press operation by the user with respect to the play list switching button 4B of the remote controller 4, the control unit 2 of the recording reproduction apparatus 1 continues the processing while alternately switching the target of the play list reproduction between the cheering scene play list and the goal scene play list.

According to this configuration, in the recording reproduction apparatus 1, as the cheering scene play list or the goal scene play list which is matched with the preference of the user at that time can be selected and switched during the play list reproduction, it is possible to visually check only the scenes desired by the user at a preferred timing.

At this time, the control unit 2 of the recording reproduction apparatus 1 presents which reproduction segment in the cheering scene play list or the goal scene play list is subjected to the play list reproduction via the cheering scene play list display frame WD and the goal scene play list display frame GD (FIGS. 12 and 13).

According to this configuration, the control unit 2 of the recording reproduction apparatus 1 can allow the user to recognize which play list is currently the play list reproduction target via the cheering scene play list display frame WD and the goal scene play list display frame GD and also visually recognize the reproduction position by using the reproduction marks PM1 and PM2, and the like.

Furthermore, in a case where the play list reproduction is conducted on the reproduction segment desired by the user by plural times while the cheering scene play list and the goal scene play list are alternately switched, the control unit 2 of the recording reproduction apparatus 1 can automatically generate the user play list on the basis of the reproduction history.

According to this configuration, by using the reproduction history generated when the play list reproduction based on the cheering scene play list or the goal scene play list is conducted, without imposing complex operation to the user itself, the control unit 2 of the recording reproduction apparatus 1 can generate and provide the new user play list matched with the preference of the user without user's awareness.

As a result, the control unit 2 of the recording reproduction apparatus 1 can set the new user play list too in addition to the cheering scene play list and the goal scene play list as the target of the play list reproduction and execute the play list reproduction while alternately switching the play lists.

Furthermore, when the play list reproduction of the reproduction segment desired by the user is conducted while the cheering scene play list and the goal scene play list are alternately switched, in accordance with the press operation by the user on the play list registration button 4C, by setting the reproduction segment as the candidate for the user play list, the control unit 2 of the recording reproduction apparatus 1 can also manually generate the user play list.

In this case, in the recording reproduction apparatus 1, as compared to the case of automatically generating the user play list, irrespective of the number of reproductions of the reproduction segment referred to as the reproduction history, it is possible to generate the user play list in a state where the preference of the user is directly reflected on the moment.

According to the above-mentioned configuration, as the control unit 2 of the recording reproduction apparatus 1 can alternately switch the play list reproduction targets during the play list reproduction conducted while following the cheering scene play list or the goal scene play list in accordance with the press operation on the play list switching button 4B, it is possible to check the scenes desired by the user at a preferred timing by the eyes.

Also, at that time, by displaying which play list reproduction is being executed while following the cheering scene play list or the goal scene play list via the cheering scene play list display frame WD and the goal scene play list display frame GD, the control unit 2 of the recording reproduction apparatus 1 can present the play list reproduction situation to the user intuitively in an easily understandable manner.

2. Other Embodiments

It should be noted that according to the above-mentioned embodiment, the case of using the cheering scene play list or the goal scene play list in which the reproduction segment is sectioned by the plurality of sectioning points CTn as the play list reproduction targets as the chapters has been described. However, the embodiment of the present invention is not limited to this, and the play list only composed of the sectioning points CTn may be used as the target of the play list reproduction.

Also, according to the above-mentioned embodiment, the case has been described in which like the second play list reproduction switching processing pattern shown in FIGS. 9A to 9C, in a case where the reproduction stop position ST3 corresponds to the reproduction segment in the cheering scene play list at the switching destination but the reproduction stop position where the play list reproduction has been stopped in past times does not exist, the reproduction position jumps to the beginning of the second cheering scene WSC2 which is the reproduction segment, and the play list reproduction (digest reproduction) is resumed from that point.

However, the embodiment of the present invention is not limited to this, and as shown in FIGS. 24A to 24C, even in a case where the reproduction stop position ST3 corresponds to the reproduction segment of the cheering scene play list at the switching destination but the reproduction stop position where the play list reproduction has been stopped in past times does not exist, in the second cheering scene WSC2, the reproduction position jumps to the time point of the reproduction stop position ST3, and the play list reproduction (digest reproduction) may be resumed from that point. In this case, the control unit 2 of the recording reproduction apparatus 1 can avoid the redundant display of the reproduced videos at the same part.

Furthermore, according to the above-mentioned embodiment, the case has been described in which as shown in FIGS. 10A to 10C, the reproduction position jumps to the beginning of the third goal scene GSC3 in the goal scene play list which is the reproduction segment closest from the reproduction stop position ST4 on the future side, and the play list reproduction only for the goal scenes (digest reproduction) is started from that point.

However, the embodiment of the present invention is not limited to this, and as shown in FIGS. 25A to 25C, instead of jumping to the beginning of the third goal scene GSC3 in the goal scene play list which is the reproduction segment closest from the reproduction stop position ST4 on the future side, by fast-forward reproducing the content having the title, the user may check the reproduced video from the reproduction stop position ST4 to the third goal scene GSC3 by the eyes.

In this case, as the control unit 2 of the recording reproduction apparatus 1 can allow the user to check the reproduced video from the second cheering scene WSC2 in the cheering scene play list to the third goal scene GSC3 in the goal scene play list by the eyes, it is possible to avoid a situation in advance in which the user does not understand the flow of the reproduced video as the scenes suddenly change.

Furthermore, according to the above-mentioned embodiment, the case has been described in which as shown in FIGS. 10A to 10C, the reproduction position jumps to the beginning of the second goal scene GSC2 in the goal scene play list which is the reproduction segment closest from the reproduction stop position ST4 on the past side, and the play list reproduction only for the goal scenes (digest reproduction) is started from that point.

However, the embodiment of the present invention is not limited to this, and as shown in FIGS. 26A to 26C, instead of jumping to the beginning of the second goal scene GSC2 in the goal scene play list which is the reproduction segment closest from the reproduction stop position ST4 on the past side, by fast-rewind reproducing the content having the title, the user may check the reproduced video from the reproduction stop position ST4 to the second goal scene GSC2.

In this case, as the control unit 2 of the recording reproduction apparatus 1 can allow the user to check the reproduced video from the second cheering scene WSC2 in the cheering scene play list to the second goal scene GSC2 in the goal scene play list by the eyes, it is possible to avoid a situation in advance in which the user does not understand the flow of the reproduced video as the scenes suddenly change.

Furthermore, according to the above-mentioned embodiment, the case has been described in which the plural types of play lists in accordance with the predetermined attributes are generated with respect to the certain content and the play list reproduction is conducted while switching these play lists. However, the embodiment of the present invention is not limited to this, and a main part scene play list obtained by gathering only the main part videos of the content and a CM scene play list obtained by gathering only commercial videos other than the main part videos may be generated, and the play list reproduction may be conducted while alternately switching the play lists.

In this case, as shown in FIG. 27A, during the reproduction of the content having a certain title in the normal reproduction mode, when the play list switching button 4B of the remote controller 4 is pressed to be operated, the control unit 2 of the recording reproduction apparatus 1 carries out the next processing.

As shown in FIGS. 27A and 27B, the reproduction position jumps to the beginning of the first main part scene MSC1 in the main part scene play list, and the control unit 2 of the recording reproduction apparatus 1 starts the digest reproduction of only the main part scenes (play list reproduction).

Then, while the play list reproduction is conducted from the beginning of the first main part scene MSC1 in the main part scene play list, when the play list switching button 4B of the remote controller 4 is pressed to be operated, the control unit 2 of the recording reproduction apparatus 1 carries out the next processing.

In this case, as shown in FIGS. 27B and 27C, the control unit 2 of the recording reproduction apparatus 1 stops the reproduction of the first main part scene MSC1, and also stores a time code at the reproduction stop position ST10, and thereafter the reproduction position jumps to the beginning of a first CM scene CSC1 in the CM scene play list to start the digest reproduction of only the CM scenes (play list reproduction).

Furthermore, according to the above-mentioned embodiment, the case has been described in which the user play list generated by using the cheering scene play list and the goal scene play list is saved by the control unit 2 of the recording reproduction apparatus 1 in the hard disc drive 16. However, the embodiment of the present invention is not limited to this, and a user play list may be uploaded onto a server on a network, and the user play list may be shared with recording reproduction apparatuses owned by other users.

In this case, when the other recording reproduction apparatuses receive the user play list generated by the control unit 2 of the recording reproduction apparatus 1 to be used for the play list reproduction, it is possible to avoid the generation of a minute deviance of the reproduction segments by being synchronized with the time code of the user play list.

Furthermore, according to the above-mentioned embodiment, the case has been described in which the user play list automatically generated by using the cheering scene play list and the goal scene play list without the user's awareness is held by the control unit 2 of the recording reproduction apparatus 1 in the hard disc drive 16 and used at the time of the play list reproduction in accordance with the request from the user.

However, the embodiment of the present invention is not limited to this, and by taking into account the preference of the user based on the viewing history or the like of the user, for example, for the user who prefers the content of a soccer game, the control unit 2 of the recording reproduction apparatus 1 may recommend the user play list already generated with regard to the soccer game as a recommendation play list.

Furthermore, according to the above-mentioned embodiment, the case has been described in which when the user play list is generated (FIGS. 15A to 15D), the first cheering scene WSC1, the second goal scene GSC2, and the third cheering scene WSC3 in the reproduction segments whose number of reproductions conducted by two times or more are arranged in the time series order to generate the user play list.

However, the embodiment of the present invention is not limited to this, and as shown in FIGS. 28A to 28D, the control unit 2 of the recording reproduction apparatus 1 may give a priority to the play list with the large number of reproductions conducted among the cheering scene play list and the goal scene play list in a case where the reproduction segments whose number of reproductions conducted is two times or more are overlapped in the same time period and arrange the first goal scene GSC1, the second goal scene GSC2, and the third cheering scene WSC3 in the time series order to generate the user play list.

Furthermore, according to the above-mentioned embodiment, the case has been described in which the hard disc drive 16 functioning as storage means, the control unit 2 and the video processing unit 14 functioning as reproduction means and play list display control means, and the control unit 2 functioning as play list switching control means constitute the recording reproduction apparatus functioning as an information processing apparatus according to the embodiment of the present invention. However, the embodiment of the present invention is not limited to this, and storage means, reproduction means, play list display control means, and play list switching control means composed of other various configurations may constitute the information processing apparatus according to the embodiment of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising a control unit including a processor configured to control reproducing from a play list in one or more modes;
   wherein, when reproducing is switched from a first play list to a second play list while a reproduction segment of the first play list is reproduced, the control unit in a first mode accesses a time code that identifies a time point at which the reproducing is switched from the first play list to the second play list,
   wherein the control unit controls reproducing from the second play list to start from a reproduction segment of the second play list having a start time closest to the time point identified by the time code,
   wherein, in the event that the reproduction segment of the first play list overlaps with the reproduction segment of the second play list at the time point identified by the time code, the start time of the reproduction segment of the second playlist is prior to the time point identified by the time code, and
   wherein, in the event that the reproduction segment of the first play list does not overlap with the reproduction segment of the second play list at the time point identified by the time code, the start time of the reproduction segment of the second playlist is after the time point identified by the time code.

2. The apparatus of claim 1, wherein, when the reproducing is switched from the first play list to the second play list, the control unit in the first mode controls reproducing from the second play list to start from a beginning of the reproduction segment of the second play list having the start time closest to the time point at which the reproducing from the first play list is stopped.

3. The apparatus of claim 1, wherein a user play list is generated based on operation of the apparatus by a user.

4. The apparatus of claim 3, wherein the user play list is generated using a reproduction history.

5. The apparatus of claim 4, wherein the user play list is generated automatically using the reproduction history.

6. The apparatus of claim 3, wherein the user play list is generated automatically.

7. The apparatus of claim 3, wherein the user play list is generated using preference information of the user.

8. The apparatus of claim 7, wherein the preference information is based on a reproduction history.

9. The apparatus of claim 1, wherein the first play list and the second play list are generated from a root content, and wherein, when the reproducing is switched from the first play list to the second play list, the control unit in a second mode fast-forward reproduces the root content from the time point at which the reproducing from the first play list is stopped to the reproduction segment of the second play list.

10. The apparatus of claim 1, wherein the first play list and the second play list are generated from a root content, and wherein, when the reproducing is switched from the first play list to the second play list, the control unit in a second mode fast-rewind reproduces the root content from the time point at which the reproducing from the first play list is stopped to the reproduction segment of the second play list.

11. The apparatus of claim 1 wherein the control unit is further configured to control display of a play list on a display, responsive to switching of reproducing to or from the play list.

12. The apparatus of claim 11, wherein, when the reproducing is switched from the first play list to the second play list, the control unit controls display of the second play list to visually demonstrate the second play list is a play list to which the reproducing is switched.

13. The apparatus of claim 1, wherein the control unit is further configured to control display of a user play list with at least one predetermined play list from which the user play list is generated on a display, responsive to reproducing from the at least one predetermined play list.

14. The apparatus of claim 13, wherein display of the user play list is controlled with the at least one predetermined play list to separately display the user play list and the at least one predetermined play list.

15. The apparatus of claim 13, wherein the user play list is displayed to visually demonstrate a reproduction segment of the at least one predetermined play list from which the user play list is generated.

16. An information processing method comprising:
   when reproducing is switched from a first play list to a second play list while a reproduction segment of the first play list is reproduced, in a first mode controlling, by a processor:
   accessing a time code that identifies a time point at which the reproducing is switched from the first play list to the second play list;

reproducing from the second play list to start from a reproduction segment of the second play list having a start time closest to the time point identified by the time code at which the reproducing from the first play list is stopped when the reproducing is switched from the first play list to the second play list; and determining whether the reproduction segment of the first play list overlaps with the reproduction segment of the second play list at the time point identified by the time code, wherein, in the event that the reproduction segment of the first play list overlaps with the reproduction segment of the second play list at the time point identified by the time code, the start time of the reproduction segment of the second playlist is prior to the time point identified by the time code, and wherein, in the event that the reproduction segment of the first play list does not overlap with the reproduction segment of the second play list at the time point identified by the time code, the start time of the reproduction segment of the second playlist is after the time point identified by the time code.

17. The method of claim 16, wherein, when the reproducing is switched from the first play list to the second play list, in the first mode controlling, by the processor, the reproducing from the second play list to start from a beginning of the reproduction segment of the second play list having the start time closest to the time point at which the reproducing from the first play list is stopped.

18. The method of claim 16 further comprising:
generating a user play list based on an operation of a user.

19. The method of claim 18, wherein the generating the user play list includes using a reproduction history.

20. The method of claim 19, wherein the user play list is generated automatically using the reproduction history.

21. The method of claim 18, wherein the user play list is generated automatically.

22. The method of claim 18, wherein the generating the user play list uses preference information of the user.

23. The method of claim 22, wherein the preference information is based on a reproduction history.

24. The method of claim 16, further comprising:
generating the first play list and the second play list a root content; and
wherein, when the reproducing is switched from the first play list to the second play list, in a second mode controlling, by the processor, fast-forward reproducing the root content from the time point at which the reproducing from the first play list is stopped to the reproduction segment of the second play list.

25. The method of claim 16, further comprising:
generating the first play list and the second play list from a root content; and
wherein, when the reproducing is switched from the first play list to the second play list, in a second mode controlling, by the processor, fast-rewind reproducing the root content from the time point at which the reproducing from the first play list is stopped to the reproduction segment of the second play list.

26. The method of claim 16 further comprising:
controlling display of a play list on a display, responsive to switching of reproducing to or from the play list.

27. The method of claim 26, wherein, when the reproducing is switched from the first play list to the second play list, controlling display of the second play list to visually demonstrate the second play list is a play list to which the reproducing is switched.

28. The method of claim 16 further comprising:
controlling display of a user play list with at least one predetermined play list from which the user play list is generated on a display, responsive to reproducing from the at least one predetermined play list.

29. The method of claim 28, wherein the controlling display of the user play list with the at least one predetermined play list is to separately display the user play list and the at least one predetermined play list.

30. The method of claim 28, wherein the controlling display of the user play list with the at least one predetermined play list includes controlling display of the user play list to visually demonstrate a reproduction segment of the at least one predetermined play list from which the user play list is generated.

31. An information processing apparatus comprising:
a play list reproduction means for controlling reproducing from a play list and including a processor;
wherein, when reproducing is switched from a first play list to a second play list while a reproduction segment of the first play list is reproduced, the play list reproduction means accesses a time code that identifies a time point at which the reproducing is switched from the first play list to the second play list,
wherein the play list reproduction means controls reproducing from the second play list to start from a reproduction segment of the second play list having a start time closest to the time point identified by the time code,
wherein, in the event that the reproduction segment of the first play list overlaps with the reproduction segment of the second play list at the time point identified by the time code, the start time of the reproduction segment of the second playlist is prior to the time point identified by the time code, and
wherein, in the event that the reproduction segment of the first play list does not overlap with the reproduction segment of the second play list at the time point identified by the time code, the start time of the reproduction segment of the second playlist is after the time point identified by the time code.

* * * * *